United States Patent [19]

Parker et al.

[11] Patent Number: 5,781,720
[45] Date of Patent: Jul. 14, 1998

[54] AUTOMATED GUI INTERFACE TESTING

[75] Inventors: Marsten Hugh Parker, Reading; Laurence Ralph Kepple, West Newton; Leah Ruth Sklar, Auburndale, all of Mass.; David Christopher Laroche, Hampton, N.H.

[73] Assignee: Segue Software, Inc., Newton Centre, Mass.

[21] Appl. No.: 697,262

[22] Filed: Aug. 21, 1996

Related U.S. Application Data

[63] Continuation of Ser. No. 978,936, Nov. 19, 1992.
[51] Int. Cl.$^6$ .................................................. G06F 11/00
[52] U.S. Cl. .................................................. 395/183.14
[58] Field of Search ........................ 395/575, 155, 395/156–161, 183.14, 573

[56] References Cited

U.S. PATENT DOCUMENTS 5,157,782  10/1992  Tuttle et al. ............................ 395/575
5,233,611   8/1993  Triantafyllos et al. ................. 371/16.1

OTHER PUBLICATIONS

Williams, Tom, "Automation Improves Speed and Accuracy of Software Testing", Computer Design, pp. 57–64, Jul. 1992.

Primary Examiner—Ayaz R. Sheikh
Assistant Examiner—Jigar Pancholi
Attorney, Agent, or Firm—Darby & Darby

[57] ABSTRACT

A method for automated testing of both new and revised computer application programs which use a Graphical User Interface (GUI). Simulated user events such as keyboard or mouse actions are automatically input into the GUI interface. The GUI is then monitored to observes the changes to the GUI in response to the input. The invention comprises a test script which is written in a high level programming language, a test executive which executes the test script, and a test driver which provides the interface to the GUI. The test script is directed towards operation on logical objects, instead of GUI-specific references. The primary responsibility of the test executive is to convert GUI-independent references into GUI-specific references. The test driver takes the GUI-specific references from the test executive and performs the actual interface to the GUI objects. A uniform hierarchial naming scheme is employed to identify each Logical Screen Element (LSE) under test, LSEs being the objects used in the GUI environment to interface with the user.

32 Claims, 12 Drawing Sheets

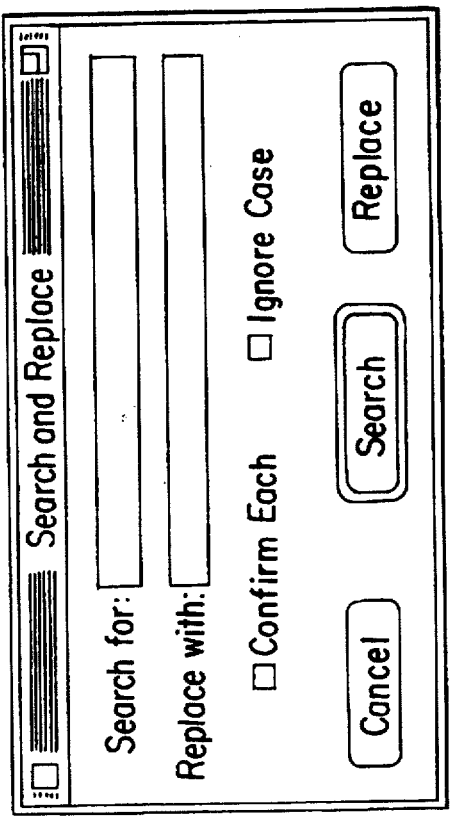
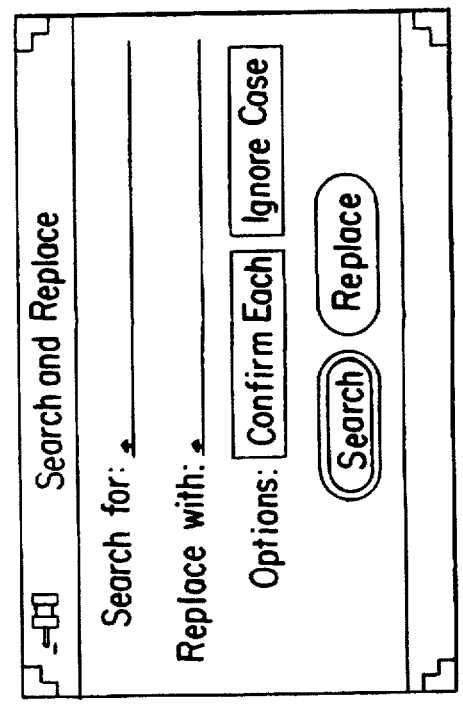
FIG. 8

FIG. 9

| A. | CONTROL IDENTIFIER |
|---|---|
| B. | CONTROL NAME USED IN THE 'C' SOURCE |
| C. | CLASS (OR TYPE) |
| D. | CONTROL NUMBER (UNIQUE, TO THE WINDOW) |
| E. | GEOMETRIC PROXIMITY TO OTHER CONTROLS |
| F. | PRETTY NAME USED IN SCRIPTS |
| G. | THE TAB ORDER WITHIN THE WINDOW |
| H. | ASSOCIATED ACCELERATOR KEYS |
| I. | IS PRESELECTION AND/OR POSTSELECTION ALLOWED? |
| J. | DOES IT HAVE A DEFAULT VALUE? IF SO, HOW THE VALUE OBTAINED |
| K. | DOES THE VALUE GET VALIDATED? IF SO, HOW IS IT VALIDATED? |
| L. | WHAT IS THE DOMAIN OF VALID VALUES? |
| M. | WHAT IS THE DOMAIN OF INVALID VALUES? |
| N. | FOR A BUTTON, WHAT DOES IT DO (PERFORM AN ACTION, BRING ANOTHER WINDOW UP, DISMISS THE WINDOW, ETC.)? |
| O. | DOES THE CONTROL GET GREYED OUT? IF SO, WHEN? |
| P. | IS THE CONTROL ALWAYS VISIBLE? IF NOT, UNDER WHAT CONDITIONS DOES IT BECOME INVISIBLE? |

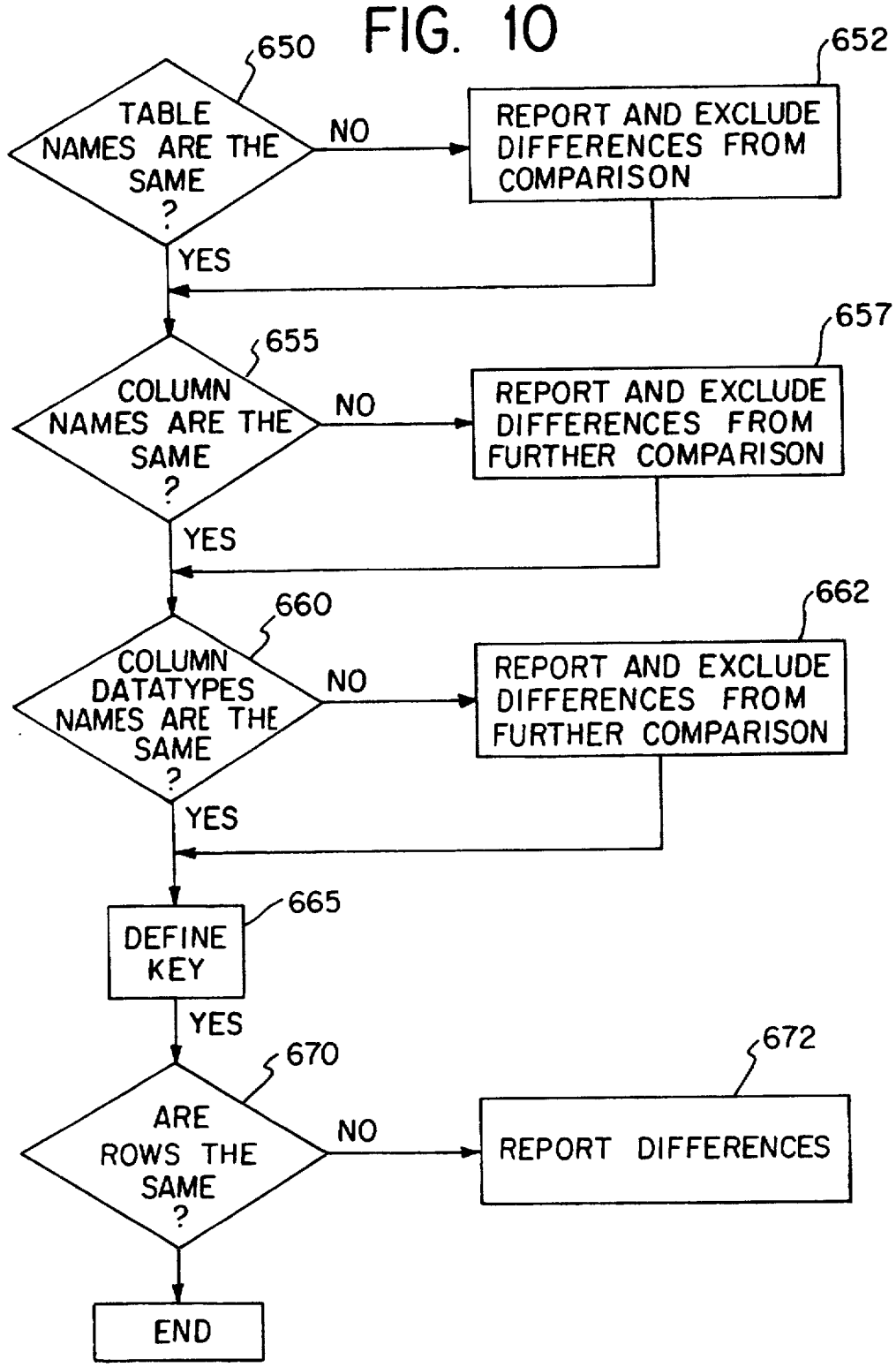

5,781,720

AUTOMATED GUI INTERFACE TESTING

This is a continuation of application Ser. No. 07/978,936, filed Nov. 19, 1992.

FIELD OF THE INVENTION

This invention relates generally to testing of computer systems and more specifically to an apparatus and method for automatically testing Graphical User Interfaces of computer systems.

BACKGROUND OF THE INVENTION

The Graphical User Interface (GUI) environment, in the realm of personal computers and workstations, is a radical departure from the traditional Character User Interface (CUI) which has been employed for years in the industry. A Graphical User Interface is a combination of: an all points addressable display such as a cathode-ray tube (CRT), a liquid crystal display (LCD) or a plasma display; input devices such as a mouse, trackball, touch screen, and/or a keyboard; and software with appropriate interfaces which allows a user to control an application program by using stylized screen elements such as menus, windows and controls. The GUI environment is rapidly transforming the shape and nature of the software industry. The active pace of GUI software development is threatened, however, by the fact that applications which are developed for the GUI environment are far more difficult to test than were character application programs. Since GUIs offer a much richer application interface, the size of the testing problem at the user interface level is much greater. For example, GUI applications usually offer a completely new and separate way of invoking program functionality using the mouse, while still maintaining a keyboard interface. This combination at least doubles the size of the testing problem. Both the mouse interface as well as the keyboard interface must be tested for each function allowing/requiring user input. Further, interaction sequences that involve both mouse and keyboard events can be difficult or impossible to replicate with confidence from test to test (e.g., Did the mouse click come before the typed text, or the typed text before the mouse click? Was the mouse moved first? Where exactly?, etc.).

In the traditional CUI environment, an application owned the screen. Not having to contend with other applications, a CUI application could write to specific screen locations without having to fear corrupting or interfering with other applications. The "screen certainty" offered by the CUI world was a great benefit to testers, who have traditionally required repeatability and consistency between executions of an application. But the GUI environment has all but eliminated "screen certainty". There are no fixed screen reference points for a GUI application. An application may appear anywhere on the screen as the GUI decrees, and the user may further move or resize it, in order to accommodate other applications on the same screen. The GUIs have made it quite impossible for Quality Assurance to use traditional testing techniques on any but a tiny fraction of the permutations an application may experience in the hands of a user.

A closer examination of the operation of a GUI application reveals that testing such an application is even more complex than is facially apparent. Underneath the interface, at the code level, a GUI programmer's difficulty in dealing with the user interface is tremendously more complex than in the traditional CUI environment (which equates to a correspondingly difficult task of testing the interface). In the CUI environment, the application programmer told the user what to do, prompting for input when the program was ready for it, and not before. In the GUI environment, the tables have been turned, with the user generating a series of mouse and keyboard events, to which the program must respond. As a result, it is much harder for application programmers to visualize a GUI application's flow of control. In addition, global and static variables must be used to preserve program state across event boundaries, and such variables are prey to a host of subtle interactional problems. These factors have contributed to real-time programming's perceived complexity for years. With the advent of the GUI environment, these problems have now entered the world of everyday application programming.

A test tool typically uses "scripts" to "drive" an application to one or more states, then "validates" those states for correctness using "baseline" representations of correctness in order to determine whether new versions of software have "regressed" in quality (the latter is known as "regression" testing). The CUI test tool paradigm calls for the use of software event recordings to drive an application to specific states, and bitmap comparisons to validate software state as reflected on the screen. The two primary components of the CUI test tool paradigm, software event recording and bitmap validation, are wholly inadequate in the GUI environment.

Prior art test tools (CUI test tools) performed software recording by detecting and storing low-level events, such as mouse moves, clicks, drags, and keyboard events. The goal of the recording is to allow a test script to drive the target software by replaying a recording of a live interaction with the software being tested. Software recording was feasible in CUI environments, because the target application owned the screen and stayed in one place throughout user sessions. Software event recordings work by preserving the physical screen locations ("hard-coded") of the events they record. A typical software recording would look something like the following:

Move 110,30
Move 125,20
ButtonPress 1
ButtonRelease 1
Move 125,60
Move 125,70
ButtonPress 1
ButtonRelease 1

The above test calls for dropping down the File menu and clicking on the Open selection (although the actions cannot be discerned from the above software recording). The numeric values after the MOVE commands are hard-coded screen locations for the objects under test (the objects being the File menu and the Open option on the File menu). The value of such recordings is minimal in the GUI environment since there is no longer any certainty with respect to the physical screen location of such objects. In fact, part of the appeal and power of the GUI environment is the flexibility and mutability of the physical screen interface.

The basic policy of the GUI environment holds that no assumptions should be made about the location and size of objects on the screen. Instead, an interested party (e.g., an application program) must ask the GUI for this information, which is only valid at that moment, and can't be usefully recorded for playback at a later time. A software recording at the GUI event level is a long list of assumptions about the state of the screen that were true at the time the recording was made, but are not necessarily true at playback time. In the software recording example described above, the user might have moved the location of the File menu and, therefore, the hard-coded screen locations for the objects under test are no longer valid, and the entire test case is invalid. And yet, the prior art method of record and playback of events against hard-coded screen locations is the primary test mechanism offered to GUI testers today.

An additional drawback of software recording involves a "Catch-22". The software under test must be correctly functioning in order to record a test that will determine whether the software is functioning correctly. An automated regression test suite cannot be built until the software is nearly working and until there aren't going to be even minor changes to the user interface.

The other primary prior art tool available to GUI testers is bitmap validation. Bitmap validation is the ideological fellow traveller of software recording. Using a "map" of the physical screen bits, the bitmap validation process compares a current state of the screen with a previously stored representation of what was adjudged to be a "correct" screen state. But as with software event recording, the nature of the GUI environment renders this tool all but useless. The size and screen position of a GUI application's windows naturally tend to be different from test run to test run. A GUI application's state is sensitively dependent on initial conditions. A small initial difference can produce a substantial change later on. For example, Microsoft Windows™ (Microsoft Windows is a trademark of the Microsoft Corporation) tiles applications as they first come up in specific screen positions, unless an application overrides the GUI. The starting position of an application during a given test run will depend on how many applications were brought up since the system was last booted. So, screen bitmaps are profoundly sensitive to exactly the wrong things from the perspective of GUI application testers.

One other significant aspect of application testing is the growing trend towards cross-platform application development. Cross-platform as used here, means pertaining to more than one GUI. Cross-platform testing, therefore, is the testing of an application that runs on several platforms (e.g., an application which runs under both Motif™ (Motif is a trademark of the Open Software Foundation) and Microsoft Windows. The term cross-platform can also refer to the hardware/Operating System (OS) level in the sense that Motif™, for example, is a cross-platform GUI because it runs on many hardware/OS combinations. As an application becomes popular on one platform, there are tremendous financial incentives for the application developer to "port" the application to a different platform. Unfortunately, the traditional CUI test suites developed for one platform are invariably invalid for testing on a different platform. This means that the entire test suite for the application will have to be entirely regenerated for each new platform. This is particularly difficult for cross-platform development since the "porting" of an application can proceed rather rapidly, and the majority of the work and pressure is on the tester to validate the porting process.

It is, therefore, one object of the invention to perform automated testing of an application program's operation with Graphical User Interface (GUI).

It is also an object of the invention to perform testing against logical screen objects and not hardcoded screen coordinates.

It is a further object of the invention tool to support the creation of test suites that are easily portable to other GUIs.

It is another object of the invention to be able to create a test suite for an application without having to wait until the application is completely developed.

SUMMARY OF THE INVENTION

The present invention is directed at testing both new and revised computer application programs that use a Graphical User Interface (GUI). The invention automatically generates inputs to the GUI which simulate user events such as keyboard or mouse actions and then observes the changes to the GUI in response to the input. In this manner, the invention validates the application program's functionality with respect to its use of the GUI. The invention has essentially three major components. The first component is a test script which is written in a high level programming language and contains the user events to be simulated, and the control and data structures necessary to validate the GUI's, and in turn, the application program's responses to the input. The test script is preferably written in such a manner that it is directed towards operation on logical objects, instead of GUI-specific references. The second component of the invention is a test executive. The test executive executes the test script. The primary responsibility of the test executive is to convert GUI-independent references into GUI-specific references. The actual GUI interface is provided for by the third major component of the invention, a test driver. The function of the test driver is to take the GUI-specific references from the test executive and perform the actual interface to the GUI objects. At the time of execution of the test script, the test executive and the test driver take the references to the logical objects contained in the script and translate them into a form which allows the invention to identify, manipulate and query the actual objects under test in the specific GUI. A uniform hierarchial naming scheme is employed to identify each Logical Screen Element (LSE) under test, LSEs being the objects used in the GUI environment to interface with the user. In some GUIs, the GUI itself assigns names to the LSEs. In other GUIs, some of the LSEs are named, while others are left unnamed. The naming of LSEs is reconciled in the present invention using a Naming Strategy. The actual details of the naming (identification) of LSEs is GUI-specific and is handled by the test executive in conjunction with the references from the test script. Initially, the test executive and the application begin execution (the executive can optionally start the application). During execution, the steps in the test script are decoded by the test executive. The test executive identifies the LSEs which are involved in the particular step and, through the test driver, validates that the LSEs are present and in a suitable state. The simulated user input (e.g., keyboard or mouse action) is then sent to the GUI, directed at the particular LSE(s). The simulated user input appears exactly as if the input came from the user. No high level GUI functions are used to simulate the user input. The test driver waits for the LSE(s) to accept mouse or keyboard events by looking for state changes in the GUI. By querying and/or observing the state of the GUI, the test driver validates that the LSE(s) have accepted the user input. If an LSE does not enter the expected state, an error is noted. If the test was successful, the test executive continues to execute the next step in the script, and proceeds in this manner until the test is complete. If the test was not successful (e.g., an error occurred), the test executive can invoke an exception handler to decide how to proceed with the test (e.g., abort or continue).

BRIEF DESCRIPTION OF THE DRAWINGS

FIG. 8 depicts a search and replace dialog example.

FIG. 9 is a partial record from a Functional Specification Repository database.

FIG. 10 depicts a database comparison process used for difference analysis.

DETAILED DESCRIPTION OF THE PREFERRED EMBODIMENT

Application Program and GUI Superclasses

Figure 1:
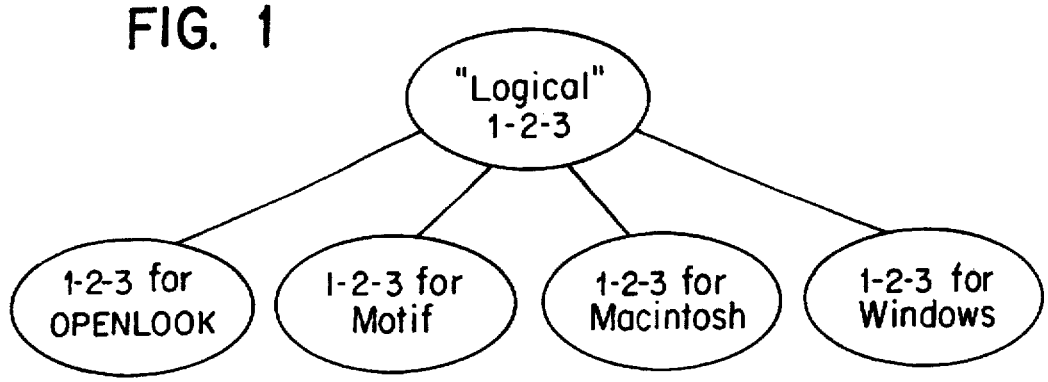
FIG. 1 is a logical depiction of an application superclass structure.

In order to create a test system in which both tests and testing benchmarks are portable between platforms, the differences between the platforms must be abstracted. To this end, the abstract of a "logical", or generic application program is created in object-oriented terms rather than platform/GUI-specific terms. In this respect, a "logical" application program is the ancestor of all GUI-specific instantiations of the application. This logical application exists at what can be termed an application superclass level as depicted in FIG. 1. FIG. 1 illustrates an example of an application superclass for the 1-2-3 spreadsheet program product available from Lotus Development Corporation. The superclass or logical level of the 1-2-3 program is the root of all of the GUI-specific instantiations such as 1-2-3 for OpenLook™ (OpenLook is a trademark of American Telegraph & Telephone Corporation) or 1-2-3 for Motif, or 1-2-3 for Macintosh™ (Macintosh is a trademark of the Apple Corporation) or 1-2-3 for Microsoft Windows™. The specification of the logical 1-2-3 application would be directed at GUI objects that are defined at a higher level than that of the 1-2-3 for OpenLook™ or 1-2-3 for Motif™. In theory and in practice, software designers first develop the logical form of the application program and then proceed to adapt and modify the logical application for the GUI-specific platforms.

Figure 2:
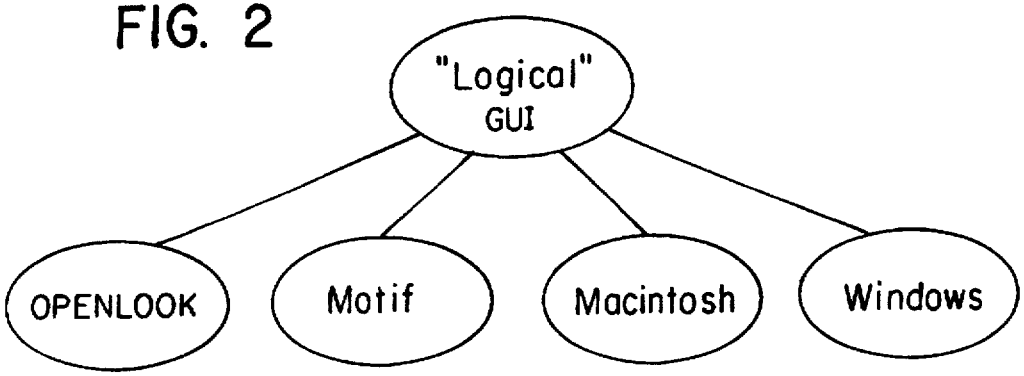
FIG. 2 is a logical depiction of an GUI superclass structure.

Defining an application superclass level implies defining a GUI superclass level as depicted in FIG. 2. The GUI superclass level depicted in FIG. 2 is a set of GUI objects that are common to all GUIs. For example, at the superclass level, the definition of a pushbutton is that the text label can be set, a user can "push" the pushbutton or press an accelerator key to execute a function, and the pushbutton may be enabled or disabled (grayed). These attributes of a pushbutton are true across all GUIs. The GUI superclass level does not contain details such as the shape of the buttons, the highlighting when the mouse is inside or when the user clicks. These details are all left to be defined at the GUI-specific platform level of the application program such as in the OpenLook™, Motif™, Macintosh™ and Microsoft Windows™ versions of the application.

The naming conventions for GUI objects differs from GUI to GUI. The GUI superclass has a single name for each of the objects which are common to all of the different GUIs.

Table 1 lists some example GUI superclass objects and their names in the various GUIs.

TABLE 1

| Superclass | OpenLook™ | Motif™ | Macintosh™ | MS Windows™ |
| --- | --- | --- | --- | --- |
| Window | Base Window | Main Window | Window | App. Window |
| Dialog Box | Popup Window | Dialog Box | Dialog Box | Dialog Box |
| Message Box | Notice | Message Dialog | Alert Box | Message Box |
| Text Field | Text Field | Text | Text Box | Edit |
| Push Button | Push Button | Push Button | Push Button | Button |
| List Box | Scrolling List | List | List | List Box |
| Popup List | Abbrev. Menu Button | Option Button | Popup Menu | Drop-down Combo Box |
| Check Box | Check Button | Toggle Button | Check Box | Check Box |
| Radio Button | Exclusive Settings | Toggle Button | Radio Button | Option Button |

For example, the basic GUI object commonly called a window is called a Window at the superclass level. In OpenLook™, this object is called a Base Window, in Motif™ it is called a Main Window, in Macintosh™ it is named a Window and in Microsoft Windows™ it is referred to as a Window.

The preceding discussion about application and GUI superclass levels is intended to serve as a basis for the understanding of structure and operation of the present invention. The framework of the superclasses provides the theory behind the development and execution of tests according to the present invention. An application represented at the application superclass level is defined as a hierarchy of GUI superclass object instances. The present invention drives and validates these superclass instances.

Figure 3:
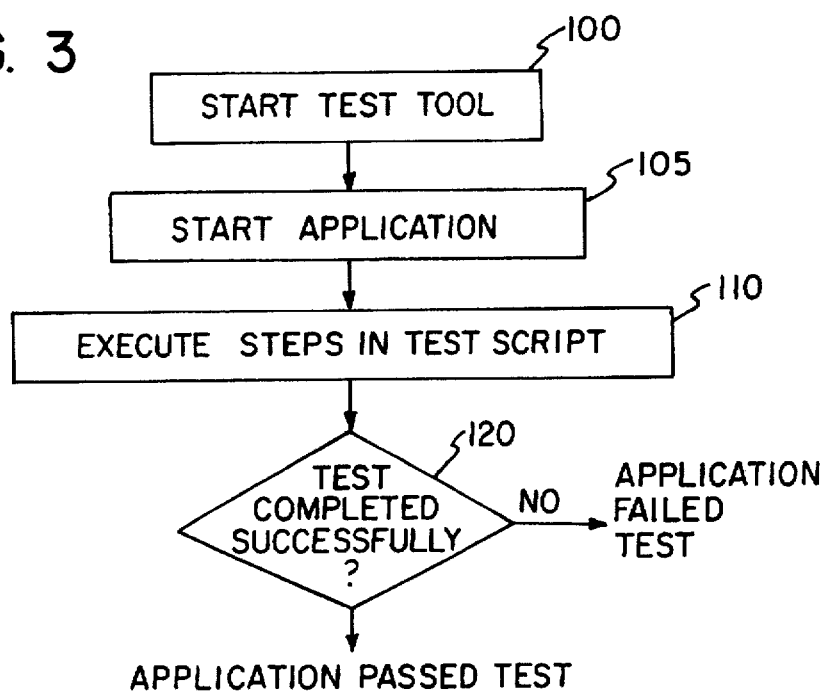
FIG. 3 is a flowchart illustrating the top level control of the test executive.
Figure 5:
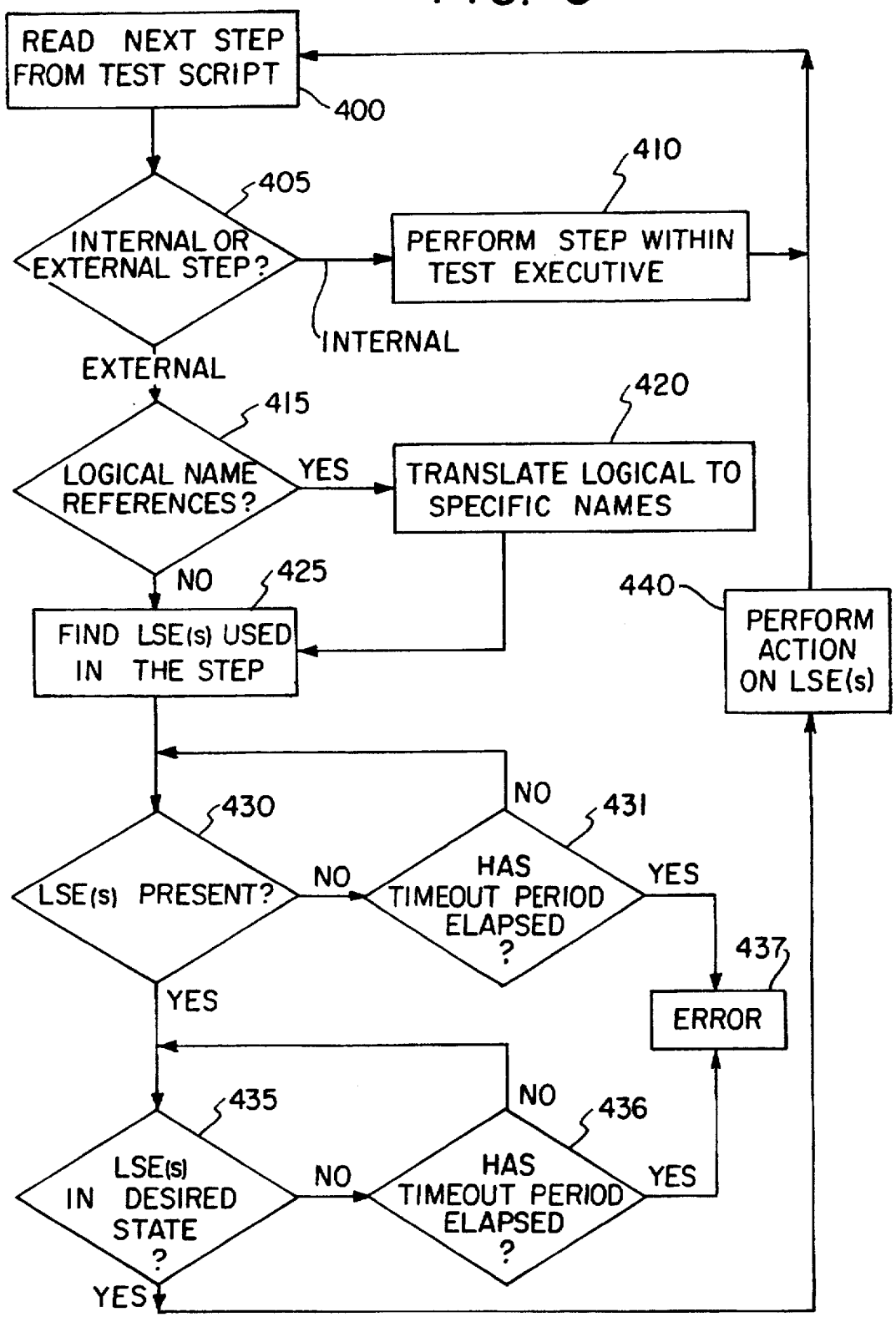
FIG. 5 depicts the overall flow of the test tool.

FIG. 3 depicts the top level flow of the present invention. In steps 100 and 103, the application under test and test tool are started. Alternatively, the test tool can start the application. In box 110, the steps from the test script are executed by the test executive and the test driver. Some of these steps will be internal steps (such as declaring variables, data arrays, etc.) and some of the steps will involve direct testing of the GUI or application. Further details of this step are depicted in FIG. 5. After the step in the script has been performed, the query in box, 120, will determine whether or not the particular step (test) has completed successfully. This function is accomplished in a variety of ways, depending on the particular test being performed. For example, one test might verify that a particular window has been generated by the application. The test script step would ask the test executive to verify that the window exists. The test executive, through the test driver, would then query the GUI for the existence of the window. If the window exists, determined from the response from the GUI, then the application passed the test, as depicted in the YES arrow exiting the decision box 120. If the window was not created by the application, as determined from the response from the GUI, then the application has failed the test and an error is reported.

The fundamental vehicles for performing a test on an application program are a test script, a test executive and a test driver. The test executive and the test driver are collectively known as the test tool. In the preferred embodiment, the test script is written in a portable language called "T", developed by, and available from the assignee of the present invention. The "T" language is not required to practice the present invention and any other appropriate programming language such as C can be used. The name T is intended to indicate that it is like C, but designed expressly for Testing. The T language is a full-featured programming language with a compiler and a full range of control and data structures. The T language was developed to be significantly easier to use than C, helping somewhat with the fact that T users are expected to be novice programmers. Throughout the remainder of this discussion reference will be made to T commands, but it is understood that other high level languages can be used.

The T language commands embodied in the test script are executed by the test executive. The test executive takes the commands in a particular T script, formats them into the protocol understood by the test driver and sends them to the test driver over a communication medium. One could use another language, such as C, to build a test executive, as will be described with respect to the present invention, that runs either the same language used to build the new test executive or yet another language altogether. In other words, one could use C to build a test executive which understands how to run Fortran, and turn Fortran commands into a format which the test driver can understand. As long as this new test executive understands how to send commands to the test driver according to the correct protocol, the test driver would be able to work with the new test executive.

The basic features required in the test script and test executives are: built-in data types including boolean, integer, and string; user defined data types; records; enumerated types; dynamic, recursive lists; typed and untyped variables; expression evaluator (similar to that in 'C'); indirect referencing of variables, fields, functions, and procedures; control structures (IF, FOR, WHILE, CASE, etc.); exception handling; in-line list constructors (similar to LISP 'lists'); built-in standard functions (similar to those in BASIC); built-in functions which allow access to User Interface Driver functionality; user-defined functions and procedures with parameters passing modes of in, out, and inout; and script modules for creating a reusable library of routines (similar to ADA 'packages').

It is important for the scripting language to be easy to use. The language does not need to be highly efficient because much of its time is spent waiting for the target application to respond. Because script development is a highly iterative process, the language should both support interactive use and not require that a script be compiled before executed. The language should be able to quickly validate the syntactical correctness of a script to avoid unnecessary runtime errors. Once a script has been developed, the language should be able to compile the script into an intermediate form for greater efficiency.

If the application being tested is a distributed system, the scripting language requires some additional features, such as addressing different machines on the network in the same script and executing code in parallel to cause something to occur on multiple machines simultaneously. This would be done by making the test language multithreaded; and seamlessly allow all functions to work on any machine, regardless if the machine is local or remote.

Although not required, providing a high-level interface to a database is often desirable. The database can be used to provide persistent storage between scripts; store all or part of the database of the target application for the purposes of allowing the script to run independent of the configuration of the target application; store scripts, required data files, and results, etc.; interface to a local software problem reporting database; and extract information from a Functional Specification Repository.

If a 'polished' user interface to the test tool is desired, graphical user interface (GUI) support could easily be added to the scripting language. When used in combination with a database, it will allow the rapid creation of custom user interfaces.

The T commands embodied in the test script are directed at the superclass level of GUI object instances. The commands from the test script are then translated into actual GUI commands via the test executive and test driver. (Again, the test executive and the test driver are collectively known as the test tool.) Since each different GUI (e.g., Windows™ or Motif™) has unique GUI commands, each test driver is unique for each different GUI. The test executive is common to, and supports all, GUI's. The test executive translates the abstract superclass command into the appropriate GUI command for the specific GUI under which the target application is running. The test executive passes the GUI specific command to the test driver. The test driver then performs the actual action on the GUI object specified in the test script command. For example, an abstract superclass command such as "get the button's text label" would be translated into the GUI-specific command, "XtGetValues" in the case of an X Windows™ application (X Windows™ is a trademark of the Massachusetts Institute of Technology). In addition to obtaining state information, such as the above example of the Get command, the test tool employs commands which imitate or simulate user actions, such as the pushing of a button or typing a key. Because the test commands are directed at superclass level GUI objects, they are inherently cross-platform and, therefore, portable. At runtime, the test tool transforms the high level script commands into GUI- and object-specific event streams that cause the requested actions to occur.

An example of the difference between the logical, superclass, test commands of the present invention and the recorded event list (used for CUI testing) will prove useful in understanding the operation and benefits of the present invention, as well as the inapplicability of traditional CUI testing methodology tools to the GUI environment. Table 2 depicts two examples of the commands required to perform a test on part of an application program. The table lists the commands required to perform the same test under both the present invention and the CUI recorded event method. In the first column in Table 2 are found the logical test commands according to the present invention, while the second column contains the series of recorded events required to perform the same test following the CUI methodology:

TABLE 2

| Logical Test Commands | Recorded Events |
| --- | --- |
| MENU_Pick("File/Open") | Move 110,30 |
| | Move 125,20 |
| | ButtonPress 1 |
| | ButtonRelease 1 |
| | Move 125,60 |
| | Move 125,70 |
| | ButtonPress 1 |
| | ButtonRelease 1 |
| TF_SetText("$Filename", "A") | Move 300,350 |
| | ButtonPress 1 |
| | ButtonRelease 1 |
| | KeyDown "<home>" |
| | KeyUp "<home>" |
| | KeyUp "<end>" |

TABLE 2-continued

| Logical Test Commands | Recorded Events |
|---|---|
| | KeyUp "<shift>" |
| | KeyDown "A" |
| | KeyUp "A" |

In the first example in Table 2, the purpose of the test is to find and drop down the "File" menu, and then select the "Open" menu item from that File menu. As can be seen in the first column, using the present invention only one command is required to perform this operation. The single superclass command MENU_Pick("File/Open") will succeed no matter where the File menu is on the screen, and no matter where the Open menu item is on the menu list. In contrast, the corresponding recorded event stream, depicted in the second column, is inherently location dependent. If, during the execution of the test, the File menu was not in the same location as when the recording was made, (e.g., a prior test moved the menu), then the recorded events test will utterly fail.

The logical test commands can also be behavior-independent. The second example in Table 2 is a test to place text in a Test Field. As seen in the first column, the present invention requires the single command TF_SetText ("Filename:", "A"). The TF_SetText command will find a Test Filed with the label "Filename:", and then type an "A" into it. The corresponding recorded event stream depicted in the second column. After moving to a hardcoded screen location, where the Test Field happened to be when the recording was made (screen location 300,350), there is a Click (as indicated by the ButtonPress and ButtonRelease events), and then the KeyUp and KeyDown events necessary to type an uppercase "A" into the control. The click was recorded because, in some GUIs, one first must click on such a control to get its attention before typing text into it. A test script employing the present invention (and therefore the test engineer) does not have to be concerned with variations in the manner in which different GUIs handle text-holding objects. A TF_SetText command coded into test scripts will place text into the same logical application object across different GUI platforms without requiring modification to the command in the script. The superclass commands are GUI independent and, therefore, the same test script will be able to run against the target application on any GUI. A more detailed explanation of the command and naming structure of the present invention is contained below in the section entitled Naming Strategy.

Description of the System Under Test

Figure 4:
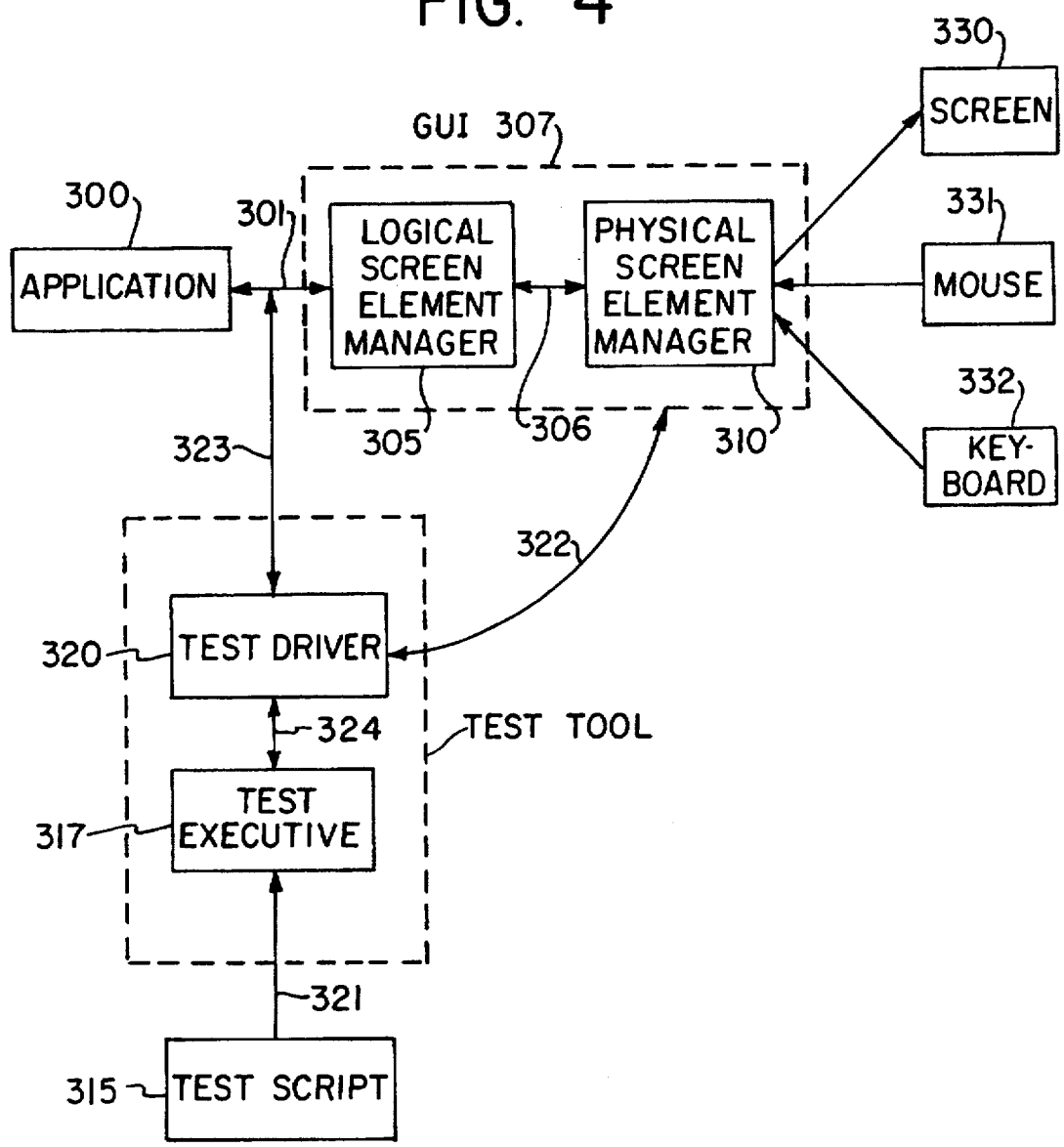
FIG. 4 depicts a computer system under test using the present invention.

FIG. 4 depicts the structure of the present invention and a GUI system under test. The system under test is conceptually divided into three parts, an Application, 300, Logical Screen Element Manager (LSEM), 305, and the Physical Screen Element Manager (PSEM), 310. The LSEM, 305, and the PSEM, 310, in combination, form the Graphical User Interface GUI, 307. The Application program, 300, implements the functions specific to the task to be performed (e.g., a spreadsheet, a word processor or a database manager). In order for the Application, 300, to interact with users, it calls upon functions (the term "functions" being used in a generic sense, not as in the specific Fortran-type function sense) in the LSEM, 305, which correspond to the user-visible elements on the screen, 330, such as buttons, menus or panels. The Application, 300, calls upon the LSEM, 305, to create, modify and destroy specific LSEs and to otherwise generally control the user interface. The LSEM, 305, contains entries for all of the LSEs in the system.

The Logical Screen Element Manager, 305, after receiving calls from the Application, 300, in turn calls upon lower level functions in the PSEM, 310, which provides the basic functionality of the interface, such as updating the screen, 330, identifying which parts of the screen, 330, correspond to which LSE in which application, maintaining a cursor on the screen as the user moves the pointing device, and synchronizing input from the pointing device and other input devices (e.g., keyboard).

Although the Application 300, LSEM 305, and the PSEM, 310, have been depicted in FIG. 4 as separate functional items, different GUIs divide up the functional work in different ways. For example, in a Motif™ application, the function of the LSEM, 305, is provided by a library of procedures known as a "toolkit" which are loaded with the application. The application directly calls the procedures in the "toolkit". In Motif™, the PSEM, 310, is a separate program known as the "X server" with which the LSEM/application communicates using a network-style communication scheme. Furthermore, the "X server" need not even be running on the same computer as the program comprising the Application, 300, and the LSEM, 305. In comparison, in Microsoft Windows™, the LSEM, 305, and the PSEM, 310, are more tightly integrated and the Application calls functions in a combined LSEM and GUI library. Regardless of the specific structure of a specific GUI, the three basic sets of functions (Application, LSEM and GUI) occur in some manner or another in all GUIs.

When an Application, 300, wishes to display some output for a user (e.g., a string of text in a window), it invokes functions in the LSEM, 305, (e.g., "display text"). During the invocation of the display function, the Application, 300, passes parameters to the LSEM, 305. Typical parameters being passed might be a text string which is to be displayed and some sort of code to identify the specific window in which to display the text. The LSEM, 305, in turn invokes lower level functions in the PSEM, 310. The LSEM, 305, passes to the PSEM, 310, lower level parameters such as the exact font to use, the color in which to display the text, the position within the window at which the text should be displayed. The PSEM, 310, in turn, performs the actual updating of the screen, 330.

When the user performs some input action, (also called an event) the PSEM, 310, will either handle it locally (e.g., simple mouse motion), or the PSEM, 310, will pass a message to the LSEM, 305. The LSEM, 305, in turn may handle the input itself (e.g., a single character typed into a file-name acceptance window), or may pass a message to the Application, 300. There is not a one-to-one correspondence between the Application, 300, to LSEM, 305, interactions and the LSEM, 305, to PSEM, 310, interactions. Some of the user inputs are handled directly at the PSEM, 310, some by the LSEM, 305, and some make it all the way back to the Application, 300, such as in the case of "callback" where a user action needs to affect the application (e.g., pushing an "Execute" button will require the PSEM, 310, to inform the LSEM, 305, to inform the Application, 300, about the user action). Correspondingly, not all of the transactions from the Application, 300, end up being processed by the PSEM, 310. For example, the Application, 300, may update the contents of an LSE which is not currently being displayed on the screen, 330, (e.g., it is hidden behind another window on the screen). In this case, the LSEM, 305, need not transmit the update to the PSEM, 310, since the displayed screen has not changed. The user can use the mouse, 331, or the keyboard, 332, in order to command the PSEM, 310, to move one of the windows on the screen, 330. This action may make visible some previously hidden LSE, and if so, the PSEM, 310, will pass a message to the LSEM, 305, identifying the region which has become visible. The LSEM, 305, will then invoke functions in the PSEM, 310, in order to draw the newly visible LSEs on the screen, 330.

The interactions between the Application, 300, and the LSEM, 305, have been depicted in FIG. 4 as occurring on the connecting element 301. In the preferred embodiment of the present invention, the connecting element 301 is a software interface, but any specific implementation of the present invention could embody element 301 as a hardware bus. Furthermore, as previously described with respect to the Motif™ GUI, Motif™ makes no real distinction between the Application, 300, and the LSEM, 305, and, therefore, the interconnection 301 is transparent. As with element 301, the connecting element 306 between the LSEM, 305, and the PSEM, 310, is preferably a software interface, but can also be implemented in hardware.

The interfaces 340, 341 and 342 connect the PSEM, 310, to the three devices, the screen, 330, the mouse, 331, and the keyboard, 332 respectively. Optionally, a system under test can have other devices such as a trackball, and the operation of the present invention would not be affected. The communication on the link 340 between the PSEM, 310 and the screen, 330, has been depicted as occurring in only one direction (from the PSEM, 310 to the screen, 330). This communication can actually be two way in the case of a touch screen. But a touch screen is, in essence, only the combination of a traditional screen and a mouse. The links 341 and 342, are also depicted as being one way, from the mouse, 331 and the keyboard, 332, respectively, to the PSEM, 310. Optionally, these interfaces could be two way, with some sort of feedback being relayed back to the user input devices. Typical messages from the mouse, 331, are "moved to the left" or "pushed center button". Typical messages from the keyboard, 332, are "W key pressed" or "left shift key released".

The Present Invention and the System Under Test

The present invention operates primarily by: monitoring the interactions between the Application, 300, and the LSEM, 310; observing the internal states of the LSEM, 305 and the PSEM, 310; and by simulating user input to the PSEM, 310. For example, to test a pushbutton-type LSE being used by Application, 300, the test tool (the combination of the test executive, 317, and the test driver, 320) determines from the LSEM, 305, that the specific pushbutton has been created and is active. The test driver performs this determination by examining the data in the LSEM, 305. The test driver, 320, then determines the screen position of the pushbutton from either examining data structures in the LSEM, 305, or by calling a GUI function. With this information in hand, the test driver, 320, can then simulate input events to the GUI, 307, which move the input cursor to the screen position of the pushbutton, and then simulate the pressing of a mouse button or other input signal to the PSEM, 307, to select the pushbutton at the cursor position. The test driver, 320, simulates exactly the user input. It does not call higher level GUI functions which would act to simulate the input. For example, if the user input is to move the mouse and press a button, the test driver generates the signals that the GUI would actually receive if a real user moved the mouse and pressed the button. The pushbutton press presumably initiates some application action which occurs immediately after the press, thus changing the state of the Application, 300, and/or the GUI, 307. If the specific GUI provides a convenient way to doublecheck that a pushbutton, checkbox or other control reached a certain internal state (e.g., "pushed" or "checked"), then the test driver, 320, will, in fact, wait until the control reaches the state which corresponds to the function which was called. If the control fails to achieve the desired state as a result of the events which were generated, a "control is not responding" exception is raised. Note, however, that the most common cause of this error would be a disabled (dimmed, grayed) control, and this disabled state is typically detected before the test driver, 320, even attempts to operate on the control (in which case the exception would be "control is disabled"). The test driver will, if possible, wait to verify that an event such as a click did, in fact, cause a specific control to receive the event.

The above described monitoring and simulation is performed by the test driver, 320, on the interfaces 322 and 323 depicted in FIG. 4. As with elements 301 and 306, the interfaces 322 and 322 are preferably implemented using software interfaces, but can alternatively be embodied though the use of hardware. Through the interface 323, the test driver, 320, is able to observe the traffic between the Application, 300, and the LSEM, 305, on interface 301. Implementation of the interface 301 varies from GUI to GUI, but most typically, the Application, 300, calls procedures within the LSEM, 305 in order to perform activities on GUI objects. Interface 323 interposes itself between the Application, 300, and the LSEM, 305, effectively intercepting the procedure calls with a mechanism known as a "wrapper". The test driver, 320 provides wrappers for selected procedures in the LSEM, 305. In effect, the Application, 300, is really calling a wrapper in interface 323, instead of calling the actual LSEM, 305, procedure. The wrapper notes the data which is being passed from the Application, 300, passes this data onto the test driver, 320, and then calls the originally intended procedure in the LSEM, 305.

A "wrapper" is used to intercept calls to a target procedure so that some additional action can be performed whenever the target procedure is called. Before or after performing the additional action, the wrapper actually calls the target procedure. In the X environment, the test tool of the present invention uses wrappers around selected routines to intercept calls which the Application, 300, makes to the LSEM, 305, over interface 301 and then routes the information contained in the application's calls over interface 323 to the test tool. An alternative technique for monitoring the Application, 300, to GUI, 307, interface is to make use of hook mechanisms built into a GUI. Microsoft Windows™ provides such hooks. Timers in the test tool can be used to poll the hooks at regular intervals.

Through interface 322, the test driver, 320, can observe the data in the LSEM, 305, in order to determine the internal state of the LSEs in the system. Since all of the information needed about GUI objects is stored in tables within the GUI, 307, the test driver, 320, can either directly examine these tables in memory or make function calls to the GUI, 307, in order to retrieve information about LSEs. The implementation of the interface 322 will again vary from GUI to GUI, but all GUIs allow one, in some manner or another, to determine the states of the LSEs in the system. In Microsoft Windows™ applications, the test driver, 320, calls procedures in the LSEM, 305, in order to determine the state of particular LSEs. The test driver, 320, uses LSE "handles" (Microsoft Windows™ naming devices for identifying LSEs) which were saved from the wrapper procedure previously discussed.

The test driver determines the state of LSEs and drivers LSEs by accessing the LSEM, 305, through interface 322.

To determine the state of an LSE, the test script, 315, specifies a request against a logically named LSE. The test executive, 317, resolves the LSE's logical name contained in the script command into a GUI-specific name as a parameter. The test executive, 317, makes a function call over interface 324 to the test driver, 320, including the GUI-specific name. In turn, the test driver, 320, calls procedures in the LSEM, 305, over interface 321, using as input to those procedures, the GUI-specific name by which the LSEM, 305, recognizes the LSE. The LSEM, 305, then returns the desired information about the named LSE, such as the text it contains or its current screen position, over interface 321 to the test driver, 320. The test driver, 320, in turn, passes the information back to the test executive, 317. To drive an LSE, the test script, 315, requests a logical operation, such as a pushbutton press, against an LSE, such as a named pushbutton. The test executive, 317, resolves the LSE's logical name into a GUI-specific name and calls a function within the test driver, 320. The test driver, 320, then uses interface 322 to send mouse or keyboard events to the GUI, 307, using the name by which the GUI, 307, recognizes the LSE to designate the LSE as the intended recipient for the events. The GUI, 307, then sends the events on to the named LSE, such that the LSE cannot distinguish these simulated events from events generated by a live user.

The test driver, 320, determines which low-level events to generate by making calls and/or looking at data structures in the GUI, 307, to locate the LSE which was specified, in order to learn its current screen location and current state. If the LSE is already in the desired state (e.g., a checkbox which is already checked), then no events are generated. Otherwise, the events required to change the state of the LSE to the desired state are generated. The decision of which events to generate is determined by a combination of the specific function which was called and the specific properties of the LSE which was specified as an argument to that function. For example, a checkbox requires just a simple click to toggle its state, but a scroll bar requires the thumb to be "dragged" to a new location and/or the arrows or page up/down areas to be clicked one or more times.

Test Tool Description

The three main tasks of the test tool are to: (1) enable manipulation of the GUI components (LSEs) of an application as would a user, by generating keystrokes and mouse events; (2) enable observation of the state of the GUI in order to assess whether or not the application performed correctly in response to the manipulation; and (3) provide the services which enable test scripts to specify functions (1) and (2) in a platform-independent manner. The test tool of the present invention accomplishes the first two tasks by defining portable functions (logical level functions) in the test driver which the test executives can call to either query the state of an LSE or the GUI, or to simulate user input into the GUI. The test driver, when receiving the logical calls from the test executive, calls GUI-specific functions within the LSEM, 305, and/or the PSEM, 310 (through the LSEM, 305). The third main task of the test tool, making the services platform-independent (superclass, logical), is accomplished by using a uniform hierarchical naming structure scheme employed in conjunction with the development of the test scripts. The details of the naming structure are described below in the section entitled Naming Strategy.

FIG. 5 shows a flowchart for the basic control flow of the test tool. In box 400, the next instruction is read from the test script. The determination as to whether the instruction is internal (with respect to the test tool) or external (e.g., send a user input to the GUI) is performed in decision box 405.

An example of an internal step would be to turn off the test driver's otherwise automatic function of verifying that a window is active before performing any operation in relation to that window. If the instruction is purely internal, then the test tool returns to the reading of the test script after performing the internal action in box 410. If the test instruction is external, the next determination, in box 415, is whether there are any GUI independent LSE name references included in the command. These names are the logical, superclass method in which the portable test script references specific windows under test. A more detailed explanation of logical LSE naming will follow in the section Naming Strategy. If the test script has referred to the object under test in a logical manner, then the test executive translates the generic reference to a GUI-specific name in box 420. Details on naming resolution can be found in the discussion accompanying FIG. 7.

Once the test tool has the GUI-specific name for the LSE, the test driver can query the GUI, 307, (specifically, the LSEM, 305, in FIG. 4) in order to find and verify that the LSE referenced in the test script command actually exists and is in the correct state to undergo the action requested by the test script (see boxes 425 and 430). If the LSE does not exist or is not in the right state to undergo the requested action, the test driver, 320, will wait until either the LSE exists and/or attains the correct state, or until a user-specified timeout interval expires, whichever is sooner (see boxes 430–436). All test driver functions which generate mouse or keyboard events will wait until the events have logically occurred (i.e., the GUI has received them). The test driver does not wait for the application under test to respond to the user events. If the test driver, 320, is unable to execute the requested action because the timeout interval has expired, the test driver reports an error to the test executive, 317 (see box 437). Upon receiving the error report, the test executive can invoke an exception handler. The exception handler may decide either to abort further processing of the script, or it may decide to clean up after the error and continue processing, giving control to the next script command after the one which produced the error. If the test driver, 320, was able to find the LSE in the correct state to accept the requested action, the action is executed in box 440, the test driver reports success to the test executive, 317, control returns to box 400 and the process is repeated for the next script instruction.

The test driver, 320, prevents the test executive from operating on inactive windows. This saves the test designer from having to remember to verify the status of a window every time one would expect that the active window will change. Unless specified otherwise, nearly every test driver function which operates on a window, automatically verifies that the specified window is the active window, and raises an exception if it is not. The test driver, 320, has a function, GUI__SetverifyActive (FALSE), to turn off automatic verification. If this function is used, a test designer must explicitly call another test driver function, WND__VerifyActive, every time it is expected that the active window will change. The test driver function, WND__VerifyActive, will raise an exception if the specified window is inactive.

Unlike other GUI testing products, the present invention interacts with applications in the way in which a human being does. That is, rather than using GUI-specific internal functions to initiate events like writing to a text field or manipulating a scroll bar, the present invention fabricates the appropriate mouse and/or keyboard events and inputs them into the GUI mouse/keyboard interface. For example, the test driver function SB__SetPosition is implemented by generating the correct set of mouse events to "drag" the "thumb" of the scroll bar to the specified location. This approach ensures that the test tool is generating events that a real user would generate, only faster and with greater consistency. Of course, the manner in which each GUI accepts user inputs (e.g., mouse events) varies from GUI to GUI; it is within the ken of one skilled in the art to determine the appropriate format for the actual GUI.

Figure 6:
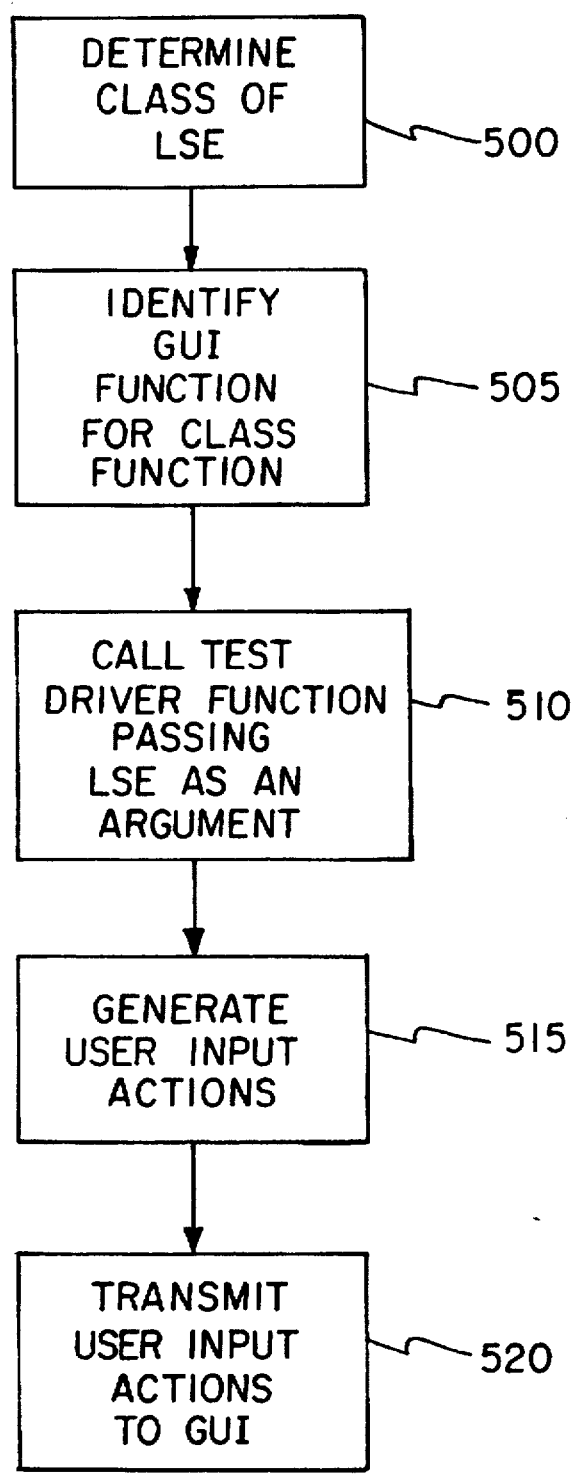
FIG. 6 is a flowchart of the test tool's class function capability.

As stated previously, the manner in which the test executive, 317, in FIG. 4, interfaces with the test driver, 320, is by calling functions within the test driver, 320, as illustrated by the connector, 324. In turn, the test driver, 320, translates the internal test tool functions in the actual user input or series of inputs which are required to implement the requested function. The user input or series of inputs are transmitted from the test driver, 320, to the GUI, 307, on interface 322. The test driver functions are specified in the test script at a superclass, logical, generic level. The test driver functions correspond to specific functions in each of the GUIs (i.e., all of the test driver functions are implemented in some manner or another in all of the GUIs). FIG. 6 illustrates a high level flow for the calling of functions from a test script. In box 500, the test executive has begun execution of a function call from the test script and proceeds to determine the class of the LSE involved in the function. The class of the LSE is included in the function call from the test script. Only certain functions can operate on certain classes of LSEs. More detail as to LSE classes is contained below in the section Naming Strategy. Once the class for the LSE has been determined, the test executive can then translate the logical function, from the test script, into an internal, but GUI-specific function for the GUI which is currently running (as depicted in box 505). Once the test executive has identified the GUI-specific function which the test script wants to perform, it calls the GUI-specific function in the test driver function depicted in box 510. The name of the LSE at which the function is directed is passed as an argument to the test driver function. The test driver is then able to resolve the LSE name into a global runtime dependent screen location which is then used to generate the appropriate user input actions which are required to implement the GUI-specific function (see box 515). The test driver then transmits the generated user input.actions to the GUI, thus simulating a real user's input (see box 520). The GUI accepts the input and performs the requested action against the specified LSE. An example function call from the test script might look something like: "FileOpen.OK.Click( )". The test executive turns this logical function call into an actual GUI function call which might looks like: "PB_Click (¹/[DialogBox]Open/|PushButton]OK¹). The manner in which this actual GUI function is arrived at depends on the class of the LSE and the particular GUI running at the time of the execution of the function call. A complete description of the execution of a function call is contained below in the section entitled "Operational Example of Naming Resolution".

Below are summarized the basic test driver functions broken down into categories. A full list of each of the test driver functions in each category and what they perform has been included in Appendix A.

Application manipulation functions allow test executives to interact with a running application. An example would be a function which starts on application.

Bitmap functions, in general, capture and compare bitmaps.

Combo box functions allow the test executive work with combo boxes. For example, removing all text from a text field in a combo box.

Checkbox functions permit the test executive to work with check boxes such as setting the selection on a checkbox.

Test driver setup functions allow the test executive to configures test driver and program environment. An example setup function would be to specify that a delay occurs before every mouse event which the test driver generates.

Keyboard functions pass keyboard events to an application such as typing a set of keystrokes.

List box functions let the test executive operate on list boxes. Returning the contents of a listbox is an example listbox function.

Menu Functions permit the test executive to manipulate and check the status of menus in the target application such as testing whether or not a menu item is checked.

Push button functions permit the test executive to operate/manipulate push buttons, such as generating a mouse click on a pushbutton.

Radio button functions permit the program to operate/manipulate radio buttons such as in generating a mouse click on the radio button.

Scroll bar functions enable the test executive to manipulate scroll bars in a window (e.g., scrolling the scroll bar to its maximum position).

System functions allow the test executive to perform operating system functions such as renaming files.

Text field and static text functions allow the test executive to work with text fields. One of the text field functions is to substitute a list of text strings for all or part of the text in a text field.

Window functions allow the test executive to perform actions on windows such as maximizing a window.

The Keyboard functions within the test driver accept the names of keys as arguments from the test script. The basic rules for specifying key names are as follows: if a key name is more than one character in length, it should be enclosed in angle brackets (for example <Enter>); if the name is only one character long (like A), it can be specified with or without angle brackets; keys which are to pressed simultaneously should be grouped in the same set of angle brackets, and separated with dashes, as in <Ctrl-Shift-F10>; repeat counts should be specified by following the key name with an integer specifying the number of repetitions, for example <Tab 2> or <X 15>; for keys with a single-character name that are prefixed by Ctrl, Shift, or Alt, it is not necessary to include the prefix; any number of keystrokes can be combined in a single string; case is not significant in key names, except for single-character names (e.g., "Enter" and "ENTER" are the same, but 'a' and 'A' are not; and partial key names are invalid.

Naming Strategy

One of the keys to the operation of the present invention is the ability of test scripts to identify GUI objects at the GUI superclass level. This means that in the test script, there are preferably no references to the GUI-specific names for objects. The task of the test driver is to drive and monitor GUI objects (LSEs) within a particular GUI under control of the test executive. The test tool must encapsulate all GUI-specific issues within it, so that programming in the test script is not influenced by any GUI-specific considerations. One of the primary tasks of the test tool is the ability to locate GUI objects by name. This "find-by-name" capability is critical both to driving and monitoring GUI objects. By using a logical name to refer to GUI objects, the test tool can ask the GUI about an object's location and state, just before making use of that information in order to implement the test script's request (e.g., to issue a click against the LSE). Asking the GUI for such information just before using it follows GUI policy. Mapping between high-level logical object names and actual runtime GUI object names is one of the most challenging tasks performed by the test tool. The present invention achieves this capability by classifying Logical Screen Elements into classes which are common to all GUIs. The classification of LSEs is determined by the properties and functions exhibited by a Logical Screen Element (LSE). An LSE is alternatively (and generically) called either a window or a control. For the remainder of this discussion, the terms LSE and window will be used interchangeably.

Each window class, according to the present invention, describes a different kind of LSE in the GUI environment, such as dialog boxes (class DialogBox), vertical scroll bars (class VerticalScrollBar), or menu items (class MenuItem). Any window in any GUI application can be described as an instance of one of the basic window classes described here. The basic window classes and their properties and functions are listed in Appendix B. The definition for a window class preferably has the following three components: (1) default window tags; (2) list of class properties; and (3) a list of functions which can be performed on the LSEs in that class.

(1) Default window tars

Each window class will have a different default window tag for each GUI. The default window tag, in combination with a window tag supplied in the test script, will allow the test tool to uniquely identify any LSE at run-time. For example, the default window tag for an object commonly known as a list box is [ListBox] in Microsoft Windows™ and is [XmList] in Motif™. All objects (LSEs) in Motif™ which have the properties and perform the function of a list box will be identified (in part) by the tag [XmList]. [XmList] is part of the tag which the Motif™ GUI uses for internal identification of list box-like objects. Defining the default window tags in the window class is necessary because the default window tags supply the GUI-specific component of a window tag, so that the part of the window tag specified in the test script can stay the same across different GUIs (i.e., patentability). In this manner, the test scripts can remain at the superclass, logical, GUI-neutral level (i.e., portable). A more detailed description of window tags will follow in the section entitled Window Tags.

(2) A list of properties which windows of a particular class possess

The tester, via the test script, gets and/or changes the values associated with properties in order to verify or manipulate the state of GUI objects. For example, an LSE whose class is ScrollBar has the property Range, which specifies the range over which the window can scroll. The window class defined as CheckBox has the property Value, which can be either true or false depending on whether the LSE is checked or not.

To get and set a window's properties, a dot operator can be used with the window's identifier. To get the value of a property for of a particular LSE, the statement:

variable=window-identifier.property can be written. "Variable" will then contain the specified property of the requested LSE. Similarly, to set the value of a property for an LSE, the statement:

window-identifier.property=setvalue can be written. The test tool will set the property of the specified LSE to the value contained in "setvalue". The set of properties for each window class has been included in Appendix B.

(3) A group of member functions

A member function specifies the operations which can be performed on instances of a window class. For example, an item can be selected in a list box by calling the member function Select of the window class ListBox. Most member functions call test driver functions. Member functions are called by name, preceding the function name with the name of the window being passed as an argument. The function name and the window name should be separated by with the dot operator as follows:

window-identifier.member-function (arguments)

where arguments are the appropriate arguments (besides a window) to the member function. For example, the command MyWin.TypeKeys ("ABCDE") will type the letters "ABCDE" into the LSE called MyWin. Of course, the window MyWin has previously been declared (see section below, Declaring Windows), and through this declaration, the test tool is able to uniquely identify the window requested and, thus, type the letters in the correct window. The member functions available to each window class have been included in Appendix B.

Declaring Windows

In order for a test script to be able to manipulate and or query a GUI object, the object (LSE) must be declared in the script. A window declaration is much like a variable declaration in traditional programming. The LSE declarations give the test tool a way to identify a specific window. Using a window declaration, it is possible to accommodate different naming conventions between GUIs, and different names in the same GUI in different releases, simply by changing the window declarations. In this manner, all code that uses the declared window name is able to remain unchanged.

To declare a window in a test script, its class must be specified and it must be assigned an identifier. The identifier is the name by which the window will be known within, and during the execution of the test script. The window declaration will also include statements to specify a window tag and (if required) information about its parent window and/or child window(s). The format of a window declaration is:

window window-class window-name (window-statements).

window-class is the class of the LSE which is being declared. In the preferred embodiment of the present invention, all window classes are defined in a common class library. For example, the common library would contain definitions for window classes for a "DialogBox" or a "ComboBox". Window-name is the identifier by which the LSE being declared will be known in the test script and in the test executive during the execution of the test script. window-statements can include window tag and parent statements, and/or declarations for child windows. Window tag statements are part of the means by which the test script is able to uniquely identify (to the test tool and in turn the GUI) the LSE to which the test script command is referring. The tag statement included in the window declaration is used in combination with the default window tag (as specified in the window class definition described above) to uniquely identify and locate the LSE at run-time. The test tool is the mechanism by which the declared tag statement and the default tag statement are combined in order to locate the specific window (see section Window Tags below and FIG. 7 for a description of how the test tool combines the tag statement in the declaration with the default window tags). The depth to which the window tag must be specified in a declaration depends on the class of the window which is being declared (though it is still independent of the GUI under which the test script will run). Appendix B contains a listing of window classes and a description of the specific tags required for each of the basic window classes.

A tag statement has the form:

[gui-type] tag tag-string

The field gui-type is filled with one of the GUIs such as Macintosh™, Microsoft Windows™, etc. The qui-tape field is optional. The field tag-string represents the part of the window tag which needs to be specified in the window declaration for certain window classes. For menu items, for example, a menu string (like "File") would be specified, for dialog boxes, the caption or title would be used. Appendix B contains a listing of the tag strings required for each of the basic window classes.

The example in Table 3 declares windows for the Windows™ 3.1 Notepad application. Note that the declarations for the windows that are children of the main window are nested within its declaration.

TABLE 3

```
1   window MainWin Notepad
2   {
3       tag "Notepad - *";
4       SysMenu SysMenu
5       {
6           MenuItem Close       {tag "Close";        }
7       }
8       Menu File
9       {
10          tag "File";
11          MenuItem New         tag "New";           }
12          MenuItem Open        tag "Open";          }
13          MenuItem Save        tag "Save";          }
14          MenuItem SaveAs      tag "SaveAs";        }
15          MenuItem Print       tag "Print";         }
16          MenuItem PageSetup   tag "Page Setup";    }
17          MenuItem PrinterSetup tag "Printer Setup";}
18          MenuItem Exit        tag "Exit";          }
19      }
```

In Table 3, line 1 specifies that a window called Notepad is being declared and this window is in the class MainWin. Line 2 specifies the GUI-specific window tag which is used during naming resolution. Line 3 specifies that this window has a system menu and line 4 further specifies that the system menu has one item called "Close". Line specifies that the winow being declared has a menu called "File". Line 6 supplies the GUI-specific window tag for naming resolution. Line 7-14 further specify that the menu "File" contains the listed items (e.g., New Open . . . ).

Window parent statements are used to specify the parent window of the LSE being declared. A parent statement is required for any LSE that a GUI defines as a "child" of another window. Different GUIs do not always build their internal LSE hierarchies in the same way. Generally, if a window looks like a window to the user (that is, it has scroll bars, a caption, a system menu, etc.), all GUIs will define it as a "top-level" window, and the test tool will not require a parent statement in order to locate it. Parent statements should be written for most other windows, especially if portability is a concern. A parent statement has the form:

[qui-type]parent window-name

The field window-name is the identifier of the parent window. The parent window needs to be declared somewhere in the test script. The field gui-type is optional.

Child windows should be declared in a script as one of the window-statements in the parent window's declaration.

Declaring child windows in this way can make it easier to maintain the test script, since declarations for related LSEs appear together.

Once an identifier for an LSE has been declared, it can thereafter be referred to by name in the test script, and the name can be passed on as an argument when executing functions in the test tool. Once a window has been declared, the set of properties for the LSE can be obtained and its member functions can be called. Children of a window can be referred to by writing their identifier(s) after the identifier for the parent window, each identifier being separated by a dot. The dot operator syntax allows windows to be referred to in a way that is readable and helps one trace LSE ancestry quickly. The test executive will properly interpret the dot operator and correctly identify the child window.

WINDOW TAGS

Again, the fundamental object in any GUI environment is an LSE (alternatively called a window). Each GUI includes many different types of LSEs. For example, dialog boxes, list boxes, text fields, and scroll bars are each considered to be "windows" in all the popular GUI environments. And each GUI has its own internal scheme for keeping track of its windows. Motif™ and OpenLook™ use "widget" and "gadget" names while Microsoft Windows™ and Macintosh™ use numeric "handles". In order to shield test scripts from these internal differences (so they can run on any GUI), it is the job of the test tool to map the GUI-specific window identifiers to its own GUI-independent window names.

Window tags are text strings that identify a window or a part of a window by specifying some or all of the window's attributes in a structured manner. The attributes a window tag specifies can include: the type of window (the window's "class"); the hierarchical relationship between the window and other windows (its "ancestry"); the window's title or caption as seen by the user (its "name"); the window's internal identifier as specified by the GUI (its "ID"); the ordinal number of the window (its "index"); and/or the static text string associated with a window (usually a list box or text field).

The test tool uses these pieces of information to construct a string that uniquely identifies a window in the particular GUI under test. The structure of a window tag is portable, but its contents are system-specific. During execution of the test script, these portable window tag declarations will be automatically converted to the appropriate window tags for a specific GUI. The test tool generates the window tags it uses to uniquely identify an LSE at run-time, based on the following rules:

1. If the default tag for the current GUI as specified in the window class definition (see above) ends in a slash'/', then the tool will append the tag information supplied in the window declaration to the default window tag (from the window class definition).

2. If the default tag for the current GUI as specified in the window class definition does not end in a slash, then the test tool combines the default tag with the tag information supplied in the window declaration, along with the information supplied in the declaration, overriding the corresponding default information. The test tool treats the part of the window tag that specifies the window's class (the part enclosed in brackets [ ]) separately from the rest of the tag.

Figure 7:
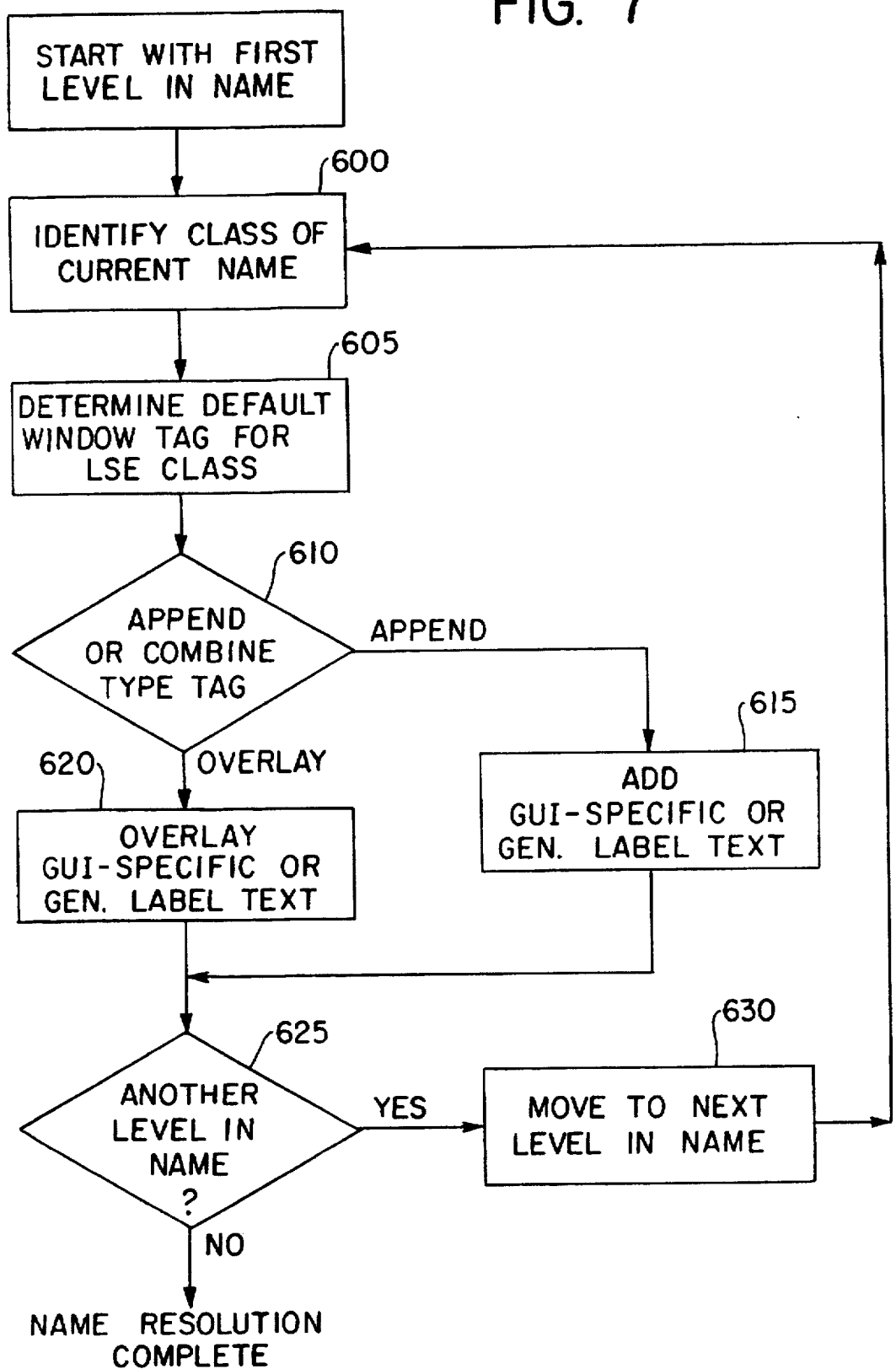
FIG. 7 depicts the flow of the naming resolution process.

FIG. 7 depicts a flowchart illustrating the naming resolution performed by the test tool. Naming resolution in the test tool is done on a level-by-level basis. For example if an LSE is identified as choices.detonate, the test tool will resolve the "choices" part of the name first, and then repeat the process for the "detonate" part. Test scripts typically refer to LSE names using the dot operator described above for identifying parent and child windows. The dot operator is converted into a slash character which is used by all of the GUIs. The first task facing the test tool is to identify the class of the current level of the LSE name as shown in box 600. The class of an LSE is enclosed in brackets when the class is specified in the LSEs name. Once the class of the window has been determined, the test tool can then find the default window tags from the class definition as shown in box 605. The window classes, (including the default window tags for each class) preferably reside in a common class library as discussed previously (see Appendix B for a listing of the default tags for the basic window classes).

Once the test tool has the default window tag and any window tags supplied with the LSE (during declaration) the test tool must decide whether to append or combine the separate tags, see box 610. If the default window tag in the class definition ends with a slash ("/") character, then the test tool will append the window tag information from the declaration statement to the default window tag (see box 615). If the default window tag in the class definition for the LSE does not end with a slash character, then the test tool combines the default window tag with the tag information supplied in the LSE declaration (see box 620). When the test tool is performing this combination, it might involve overlaying part of the default window tag with GUI-specific tag segments supplied in the declaration.

Once the test tool has either appended or combined the default window tag and the tag segments from the LSE declaration, it determines whether or not there is another level in the LSE name which needs to be resolved (see box 625). If there are no other levels in the LSE name, then the naming resolution is complete and the process is completed. If there are remaining levels in the LSE name (see box 630), then the entire process is repeated (looping back to box 600) until the entire LSE name has been resolved.

As an example, a test script command might reference an LSE with the name choices.detonate. The test tool begins by resolving the "choices" part of the name. It first determines that choices has been declared as belonging to the class PopupList (see box 600 in FIG. 6). The test tool then looks to the class definition for the class PopupList and sees that the default window tag for LSEs in this class is merely [PopupList] (see box 605). Since the default window tag does not end in a slash character, the test tool combines and tag segment from the LSE declaration with the default window tag. In this example, the declaration of the LSE named "choices" did not contain any tag segments; therefore, the name "choices" is resolved into [PopupList] Choices:.

Since there, is another level in the LSE name, the test tool repeats the process for the part of the name "detonate". Its class is determined to be PushButton (from the LSE declaration), and the default window tag for a PushButton is merely the class identifier [Pushbutton]. Since the default window tag does not end in a slash, the default window tag is combined with the declared tag segments. No tag segments were supplied in the declaration of the LSE "detonate", so the name is resolved into [PushButton] Detonate. Once all of the levels of the name have been resolved, they are combined in the final GUI-specific name [PopupList]Choices:/[PushButton]Detonate. This is the name which will enable the test driver to uniquely identify the LSE on which it wishes to operate.

Listed below are various rules for the naming of LSE objects according to the present invention. These rules relate to different parts of the window tag and include: specifying a window's class; specifying a window's ancestry; specifying a window's name; specifying a window's ID; specifying a window's index; specifying adjacent static text; and referencing parts of a window. The rules are intended to aid in the proper naming of objects in a test script. To be absolutely certain that the script is identifying the proper object, a combination of the listed tag parts of the window can be used when an LSE is referenced. The window class and ancestry can be used with the window's name or ID or index or adjacent static text. The script writer must choose between specifying the name, ID index and adjacent static text. Only one of these parts can be used in a LSE name; otherwise, proper resolution of the LSE name is not possible. The downside to using the combination of these window tag segments is that the test script is no longer as portable between GUIs. The danger with using too few tag segments is that the object will not be properly identified and the test will fail. For example, two popuplists are running in the application, and no specific identification of the LSE is made in the test script command, other than the desired object is a popuplist. In this case, the test tool is not sure to which PopupList the script is referring. The designer of the test suite must strike some balance between portability and specificity in order for a test case to run successfully. As stated previously, one method of designing scripts is to include all of the GUI-specific references in header files, which minimizes the changes which need to be made when a script is ported.

Specifying a window's class

The various popular GUIs give a class to each window. A class is a way to classify windows according to type of LSE as was described above in Naming Strategy. Examples of the basic superclass windows have been included in Appendix B. Application developers often create their own class names for custom windows as well. A class specifier in a window tag is always enclosed in brackets. Any segment of a window tag can optionally include a class specifier. If a segment include a class specifier, it should be enclosed in brackets and put it at the start of the segment, just after the slash (e.g., /[ListBox]). The class identifier inside the brackets can include wild card characters, and is not case sensitive.

Specifying a window's ancestry

In window tags, slash characters separate the components of the tag. If a tag starts with a slash, it refers to a child or descendent of the "desktop." If a tag does not start with /, it refers to a child or descendent of the active top-level window. An empty tag, (" "), or a tag that consists of a dot (.) specifies the active window itself. Similarly, (two dots) specifies the parent of the active window. Wildcard pattern matching syntax can also be used in window tags. Any number of '*' and '?' characters can be embedded in a window tag's "name" and "class" components. Each '*' matches zero or more of any character and each '?' matches any single character.

Specifying a window's name

A window's name is the text that is visible to the user, like the caption of a dialog box, the title bar of a pop-up window or the text in a radio button. To identify a window by its window name, the text of the name is enclosed in double quotation marks " ". Window names make useful window tags because it is easy to read them in the test script, and because they often stay the same when the application is ported to another GUI. (Note: See "Specifying adjacent static text" below about identifying a window via the static text associated with it.)

Specifying a window's ID

A window's ID is the internal code that an application programmer uses to refer to a window in the resource portion of an executable file. It is a constant, specified in the program's source code. A window ID is written in a window tag as an integer value preceded by a $ character. In order to make test scripts portable, it is better to use the window name (if possible) rather than the window ID to identify the window, because window IDs will be different on different GUIs.

Specifying a window's index

A window's index is the ordinal value of a window among other windows of the same class. If there are three windows with class PushButton, the first ("top") one has an index of 1, the second an index of 2, and so on. A window index is written in a window tag as an integer value preceded by a # character. A window's index might be the same on different GUIs (so it is more portable than a window ID), but it is more likely to change than using the window's name. For example, "[TextField]#2" specifies the second TextField window.

Specifying adjacent static text

Some types of windows, like text fields and list boxes, do not have names of their own, but are often placed near a static text field that looks like a name or label for the window from the user's point of view. The test driver treats these static text strings as if they were the name of the adjoining window. To identify a window by the static text associated with it, precede the text with a carat character. Usually it is best to include the window's class along with the adjacent static text, to ensure that the window is uniquely identified.

Referencing parts of windows

It is often useful for test scripts to refer to specific parts of a window that are not implemented as separate child windows, but which nevertheless exhibit some of the behavior of child windows. These window "parts" can be referred to in any window tag by ending the tag with "/$<part>", where <part> is a specific part name. Part names are most useful for initiating mouse events; it is much easier to say "click on the minimize box" than "click in the window at coordinates 432,10." The test tool supports the named window parts listed in Appendix C (note that most windows contain only a subset of these parts).

Window tags for menus

The test tool treats window, tags for menu items as if they were child windows (which they are in Motif™ and OpenLook™). To identify a menu in a test script, use a window tag that includes the part name of the menu ($Menu or $SysMenu), followed by the menu path, with no class specifier. For example: /Notepad*/$Menu/File/Open specifies the 'Open' item on the 'File' menu of the Notepad window; or $SysMenu/Maximize specifies the 'Maximize' item on the system menu on the active window; or $Menu/Help/About specifies the 'About' item on the 'Help' menu on the active window; or /Notepad*/$Menu/Edit #2 specifies the 2nd item on the 'Edit' menu of the Notepad window; and finally $SysMenu/$61488 specifies the item with internal id of 61488 (usually the Maximize item) on the system menu of the active window.

Window tags for scroll bars

The test tool sometimes treats the scroll bar components of a window (as distinct from the scroll bar controls) as if they were child windows. A scroll bar may be identified by using a window tag that ends with the part name for the desired scroll bar, as in "/[Notepad]#1/ $HorizontalScrollBar" (or simply "$HorizontalScrollBar" if one knows Notepad is already active).

Parsing of internal window names

The test tool changes all internal window names it gets from the GUI (via system calls) according to the following rules: it removes any embedded ampersands that aren't followed ("escaped") by another ampersand; it truncates names at the first embedded tab or backspace; it truncates names at the first embedded ellipsis; it trims off leading and trailing whitespace. The test tool modifies names passed to it from test scripts according to these same rules, except the first. These rules allow the name used to identify a window to look like what the user sees on the screen. Embedded ampersands are used by application programmers to tell the GUI which character of a menu or label to underline, and which character to use as the keyboard shortcut. Embedded tabs are used in menus to right-justify the accelerator key name. Ellipses are used on menu items and push buttons to indicate that they lead to a pop-up window (dialog box).

Operational Example of Naming Resolution

Illustrated below is a complete "vertical slice" of the execution of a GUI-independent command contained in a test script. Assuming that a typical "File Open" dialog box is currently the active window of the target application, the command contained in the text script is:

FileOpen.OK.Click( ).

The purpose of this command is to simulate the user action of clicking the mouse on the "OK" button, presumably causing a selected file to be opened. For the command to succeed, the test script developer must have supplied a window declaration for the "FileOpen" window which includes a member called "OK" which is a "PushButton". Furthermore, the designer must have supplied window tags for each of these members of the declaration, and for each type of GUI to be targeted by any script which includes the declaration. The declaration might look like this:

```
window DialogBox FileOpen
{
    msw tag "Open";              // Microsoft Windows Tag
    mac tag "[2:0.1|File Open";  // Macintosh Tag
                                 // (other components of the
                                 // window could be included
                                 // here)
    PushButton  OK       { tag "OK" }
    PushButton  Cancel   { msw tag "Cancel"; mac
                            tag "Done"; }
}
```

When the test executive receives the "FileOpen.OK.Click( )" command to execute, it will have already parsed and loaded the above window declaration. At runtime, it will use the declaration plus its knowledge which type of GUI is running on the current default target machine, to construct a PB-Click command with a GUI-specific window tag as its argument. In this example, if the target machine was running Microsoft Windows™, the test executive would convert "FileOpen.OK.Click( )" into:

"PB_Click('/[DialogBox]Open/[PushButton]OK|¹'".

It the target was a Macintosh™, on the other hand, the test executive would produce:

"PB_Click('/[2:0.1|File]Open/[PushButton]OK]¹)".

The test executive determines the GUI type on each target machine by automatically calling the test driver function 'GUI_GetType( )' at the start of each script.

Upon receiving the "PB_Click" command, the test driver will parse the GUI-specific (but screen location independent) window tag, resolve it to a global runtime-dependent screen location, and generate a simulated mouse press and release (click) at that location.

In summary, the test executive is responsible for mapping GUI-independent window declarations to GUI-dependent window tags, and the test driver is responsible for mapping GUI-dependent window tags to runtime-dependent screen coordinates.

FIG. 8 illustrates two typical Search and Replace dialog boxes under the same application program instantiated under two different GUIs. The figure depicts the appearance of the same dialog box presented by the OpenLook™ and the Macintosh™ as examples. These dialog boxes play the same functional role in each GUI. Their only differences stem from the fact that one is instantiated under OpenLook™, and the other under the Macintosh. The test tool of the present invention allows the tester to write the following test script that will run against either instantiation of the Search and Replace dialog box:

| | |
|---|---|
| MENU_Pick("Edit/Search and Replace"); | //Drops down Edit menu, //picks Search and Replace |
| TF_SetText("Search for", "tetsing"); | //Finds edit control //labeled "Search for", //and fills in "tetsing" |
| TF_SetText("Replace with","testing"); | //Finds edit control //labelled "Replace with", //and fills in "testing" |
| CHK_SetState("Confirm each", FALSE); | //sets state of control //labelled "Confirm each" //to FALSE |
| CHK_SetState("Ignore case", TRUE); | //sets state of control //labelled "Ignore case" //to TRUE |
| PB_Click("Replace"); | //finds and clicks on //button labelled "Replace" |

In this example, the convention for command names is that the first element in the command is the superclass object (e.g., TF means Text Field, MENU means menu, CHK means checkbox, and PB means pushbutton), the second element is the actual superclass command and the items in the parenthesis are the arguments for the command.

The MENU_Pick command drops down the Edit menu, and selects the Search and Replace menu object. Next, the script requests that the test tool locates an edit control object which is labelled with the string "Search for", and when found, enter into the object, the text "tetsing." The same sequence is followed for the "Replace with" edit control object. The CHK_SetState commands set the state of the two-state controls labelled "Confirm Each" and "Ignore Case" as specified in the commands. Finally, the PB_Click on the button labeled "Replace" initiates the specified action.

The script listed above will drive the Search and Replace dialog box on any GUI. Although the "Confirm Each" and "Ignore Case" controls are two-state pushbuttons under OpenLook™ and checkboxes under the Macintosh, as depicted in FIG. 8, the CHK_SetState command works with either control. The test tool handles the details of mapping the logical, superclass test command to the type of two-state control that is actually used under a particular GUI.

The previous discussion on CUI type software recording vs. superclass test commands has focused on going in one direction: from high-level test commands to low-level GUI events. The disadvantages of low-level GUI event recordings have also been discussed. One feature of the present invention is the ability to go from low-level GUI events to a high-level command (logical) recording. It is quite possible to create a high-level test script as the output of a recording session given the kind of logical-to-physical mapping capability of the present invention. To accomplish this, the test tool detects an event, like a mouse press, and queries the GUI (using function calls, direct data structure access, wrappers, etc.) to find out in which window the event occurred. The tool can then build a window tag for that window and, depending on the type of window, and other recent events, generate an appropriate test driver function call. A logical recording would clearly be superior to the low-level GUI event recording. The high level command recording would not be dependent on physical screen location, for example; the logical name of the object would be recorded, and not the physical screen coordinates of the object's temporary location. If it is necessary to make software recordings at all, logical recordings are the only kind to make. Even logical software recordings will be diffuse, disorganized, and hard to maintain compared with test executives that are built as part of a software engineering approach to the testing problem. Since no software recording approach is perfect, recordings will still fail to play back correctly. Changes to the user interface will still require the test engineers to update recordings, and updating recordings will always be significantly harder than updating test scripts which has been engineered to be updatable.

Figure 11:
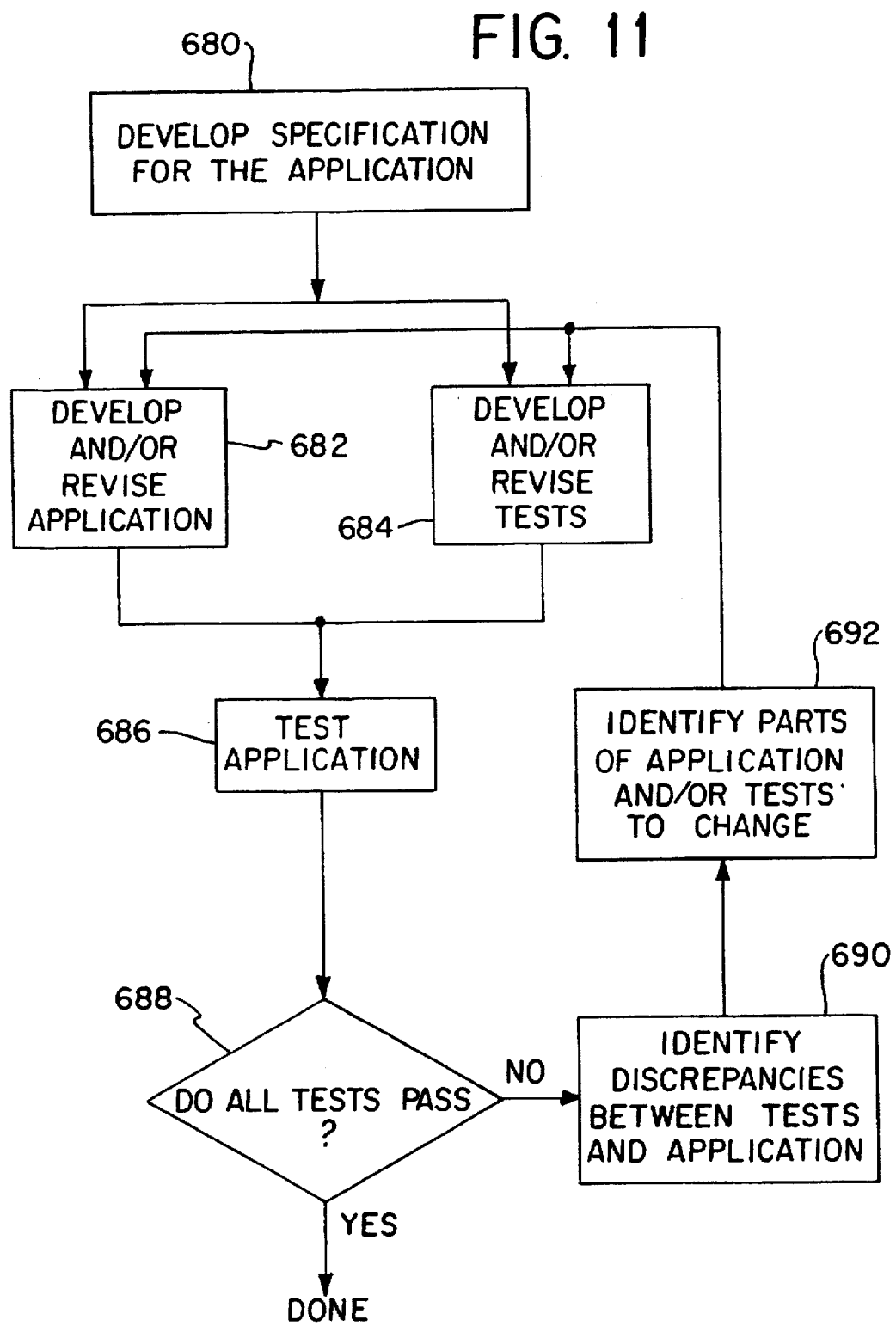
FIG. 11 illustrates parallel application and test script development.

The testing methodology provided by the present invention allows the principles of software engineering to be applied to the testing of applications as well as to the development of such programs. The discipline of software engineering was developed primarily to make it possible to create large quantities of complex code in such a way that it can be managed and maintained at reasonable cost. The software development project of the near future will consist of two interlocking development projects: the development of the product software, and the development of the software (test scripts) that will test the product software. An example product development flow is depicted in FIG. 11. The first task, in box 680, is to develop the functional specification for the application. With the functional specification in hand, both the application coders and the test developers can begin their development in parallel (see boxes 682 and 684). At some point in the development process (does not have to be when either the coders or the testers are complete) the application can be tested as shown in box 686. If all of the tests pass, box 688, then the product is ready to be shipped (if the test was performed after all code was implemented). If the test did not pass, the test results can be analyzed in order to determine the problems with the application and/or the tests (see boxes 690 and 692). Once the problems have been identified, the process begins once again in box 682 and/or box 684 (depending on where the problems which caused the test failure were discovered). Instead of being largely a brutal manual effort crammed in at the last moment before product release, GUI application testing according to the present invention is a productive software engineering task.

A distinct advantage of a GUI test suite (a series of test scripts) written according to the present invention is that the test suite is really an active functional specification of the application program. If the functional specification of a product is expressed in the form of actions that the software should be able to support, the set of those actions can be expressed in the form of logical, superclass, commands contained in a test suite. This test suite actively enforces conformity not just to some abstract ideal of correctness but also to the specific definition laid out in the functional specification. The cross-platform capable test suite then allows the functional specification to be tested against the several GUI-specific instantiations of the application program. For example, the Motif™ phase of an application development project would be required to pass the same functional test as the OpenLook™ phase. All of the knowledge about what the product was supposed to do, as expressed in the OpenLook™ test suite, can be applied, unchanged, to the functioning of the Motif™ version of the product.

In an alternative embodiment of the present invention, the test script is driven by data contained in a functional specification repository. The functional specification repository is a database which contains information about the functional specification of the application to be tested. It includes detailed information about each window in the application, and how the windows are related to each other. Some of the information which would be stored about a window includes: window caption; window class (or type); its own menus; the controls which comprise the window; how to navigate to it (location in window hierarchy); the method used to define the initial state, size, and position of the window; the control which receives the initial focus; and window attributes as defined by the windowing environment (i.e., can the window be iconized, resized, scrolled etc.).

Depicted in FIG. 9 is part of sample record from a functional specification. The sample record contains information which would be stored about the controls listed for each window. The information contained in function specification repository may be extracted from a resource file, the application source code; and/or the application's executable code. The information may also be entered directly using a program which allows the user to point at objects in the application and enter pertinent information about that object. Once the repository is populated, the same methods originally used for populating can be used for updating. For example, suppose the repository has been created and then the developers decided to change the naming conventions of all the controls. As long as one aspect of the control is preserved (like control id), all other information about the controls can be automatically updated.

It can be seen from FIG. 9 that the use of a functional specification repository greatly enhances the creation, maintenance and portability of a test script. For example, item J in the sample record depicted in FIG. 9 contains the default value for a window control. A test script (when being executed by the test executive) can read this default value from the database, thereby obviating the need to hard code the default value into the script itself. If the default value changes, the database is changed, not the script. If the default value is different on a different GUI, it is again the database, and not the script, which needs to be updated.

Part of the object behavior defined at the GUI Superclass level is the provision of object data on request. One of the strengths of the present invention is the ability to use and re-use object data collected during a baseline execution of a test script. The test tool of the present invention can, for example, query a text field as to its contents and receive an ASCII string in response to the query. The querying and receiving of data is performed by the test driver according to the methods described above. The tool can then store the results in a file for comparison against later runs of the test. Or the tool can query a menu item as to whether it is currently available for selection, and store a boolean value. Since such object data is in ASCII format, it represents an ideal crossplatform validation database. The data that appears in such a database, such as the contents and states of all controls in a particular dialog box, tend to remain constant in all ports of a particular application across GUIs. Therefore, the data generated in the testing of an application in one GUI (baseline data) can be used to validate the correctness of an application running under a second GUI, even though the baseline data was originally obtained under the first and different GUI. In addition, an ASCII version of the data and state information relating to a dialog box is far more compact and easier to manage than would be a bitmap.

Any previous discussion notwithstanding, there are still situations in which bitmaps are required to validate the state of an application. For example, the code that takes an application's internal data representation and renders it on the screen must be tested using bitmaps. The present invention does not preclude bitmap validation, but allows its use to be limited to the situations where it is absolutely necessary. A frequent technique used with CUI-paradigm test tools was to write internal data out to the screen just so the test tool could notice it via the bitmap. Such strategies were poor for CUI applications, and are useless in the GUI environment.

There is certainly a difference in perspective on the degree to which bitmap validation is necessary between the writer of a GUI itself and the writer of GUI applications. A substantial part of the code of the GUI itself involves rendering objects on the screen. A test plan for a GUI would therefore need to make substantial use of bitmaps (e.g., to test if the rendered object really made it to the screen). But since a GUI itself would never be ported to another GUI, the superclass testing methodology of the present invention is not terribly relevant when the concern is with testing a GUI itself. The intent of the present invention is to enable cross-platform testing of individual applications that can be ported to other GUIs. Individual applications may also, of course, draw directly on the screen, and that rendering code must be tested using bitmaps. But even applications that are heavily graphical still can avoid bitmaps for testing everything but the rendering code itself.

Having logical as well as bitmap validation capabilities allows the test tool of the present invention to focus precisely on what is being tested by a given test case. This ability to focus on the target of the application's test plan is preferable to bundling everything, including the functionality of the GUI itself, into a huge, unwieldy, unportable, and hard-to-analyze bitmap.

Difference Analysis

Difference analysis refers to the process of comparing two observables and reporting the differences. The term observable refers to any information about the application which can be captured automatically. In situations where differences are expected and not significant, a filter may be specified which automatically masks out insignificant differences as specified by the user. The actual method of difference analysis depends on the type of the observable.

Bitmap difference analysis involves comparing the pixels of two bitmaps. The analysis starts by checking the sizes of the bitmaps. If the bitmaps are not the same size, they are considered different. If they are the same size, the color of each pixel in the two bitmaps is compared until either a difference is detected or all pixels have matched. Bitmaps often contain areas where differences are considered insignificant. The current date and time is a good example of the type of information which, if not masked out, would guarantee that the bitmaps are never the same. This problem is solved by allowing the user to specify a set of inclusion/exclusion regions which can be used to mask areas of a bitmap where differences are not considered significant.

Character screen difference analysis compares the characters and the attributes of two screens. The analysis starts by checking the sizes of the screens. If the screens are not the same sizes, they are considered different. If they are the same size, the characters and their attributes are compared. Screens often contain areas where differences are considered insignificant. The current date and time is a good example of the type of information which, if not masked out, would guarantee that the screens are never the same. This problem is solved by allowing the user to specify a set of inclusion/ exclusion regions which can be used to mask areas of a screen when differences are not considered significant.

Text difference analysis compares the contents to two text files. It's output consists of a the list of additions, changes, deletions, and moves that would need to be applied to the first file to obtain the second. By default, it compares the text files at the line granularity. However, the line is not always the best unit of comparison. For example, the text file may contain two columns of data. For this reason, test analysis allows the user to specify the following units of comparison: single Line (the default); fixed number of lines; variable number of lines separated by a delimiting line; and columns.

There are many instances where differences between two text files are expected and should be ignored. A good example of this is the date and time in the header of a report. For this reason, the text difference program allows the following methods for filtering differences: ignore case; ignore blank lines; ignore leading/trailing spaces; ignore lines containing a specified pattern; ignore anything matching a specified pattern; and ignore specific ranges of pages, lines, and columns. The methods listed above can be used in combination with each other. For example, the filter to specify the date on a report could be defined as anything matching the pattern '??/??/??' on the first 5 lines of a page.

Database difference analysis compares the structure and content of two databases. By comparing the structure of the two databases before comparing their content, the analysis can keep the difference output to an absolute minimum. For example, suppose that two tables are being compared and one of them has a defined a new column. Instead of reporting that each row in the two tables is different because of the new column, the column is reported to have been added to the table and then the rows are compared.

The database difference analysis follows the procedure outlined in FIG. 10 in order to compare two databases. Decision box 650 compares the names of the tables defined in the two databases. All tables which are not present in both databases are reported as differences and are further excluded from the comparison in box 652. In decision 655, the names of the columns for each table defined in both databases are compared. All columns which are not present in both tables are reported as differences and are further excluded from the comparison in box 657. In decision 660, the data types of the columns for each table defined in both databases are compared. All columns which are not of the same data type are reported as differences and are further excluded from the comparison in box 662. In box 655, a key is identified for each table defined in both databases. The key is derived from the following information listed in order of preference: primary index; secondary unique index; secondary non-unique index; all columns in the table. The key is used to establish equivalence between two rows. For example, suppose a table had employee name, address, and salary as columns. The key in this instance would be employee name; two rows with the same employee name are considered equivalent. This allows the program to report changes in rows identified by an employee name. In box 670, the rows for each table defined in both databases are compared. All rows (as identified by the key for the table) which are not present in both tables are reported as differences and are further excluded from the comparison. In box 670, the equivalent rows for each table defined in both databases are also compared. Only the columns with the same names and data types in both databases are used in the comparison. Any differences are reported as changes to the row, identified by its key.

The term observable refers to any information about the application which can be automatically captured. Examples of observables are: bitmap snapshot; character-based screen snapshot; logical snapshot of the controls of a window; reports; debug output; log of database translations; dump of database tables; message traffic between applications and machines; any file generated by the application; speaker output; and memory.

Observables are used in regression testing by comparing a previously saved version of an observable (baseline version) to a newly captured observable (test version). If the baseline version of an observable is different than the test version, a error is raised. Unfortunately, not all errors generated this way actually map to errors in the application. If a bitmap observable is used to determine differences in screen appearance, an error will be generated when a control is moved over only one pixel. More often than not, this is not desired and much time needs to be spent looking at superfluous errors and promoting a new baseline.

For this reason, careful consideration needs to be given when deciding which observables should be used. In general, the further the observable is from representing the desired information, the more 'noise' it will generate. Instead of using a bitmap observable to check if a window or screen has changed, a logical snapshot of the information about each control could be used. This approach will not be sensitive to the location of controls on the screen. Also, when a difference is detected, the actual controls which differ can be reported, thereby keeping the 'noise' to an absolute minimum.

Results Analysis

Because automated regression generate such large volumes of information, it is important to be able to run a group of scripts as an entity with results managed together as a set. When a script or group of scripts are executed, a single results file is created which stores all information pertinent to the execution. The organization of a sample results file is depicted in Table 4.

TABLE 4

Script A
  Script 1
    Test Case 1
      Error 1
        Error text
        Error data
      Error 2
      ...
      Error N
    ...
    Test Case 2
    ...
    Test Case N
  ...
  Script 2
  ...
  Script N
  ...
Script B
  Script 1
  ...

Each test case has a unique tag associated with it. When an error is encountered, an entry is written to the results file.

A hypertext-like viewer could be used to view the results file. At the first level, one would see the scripts which executed and how many errors there were. If a script was selected, one would see the test cases and how many errors there were for each test case. If a test case was selected, one would see the list of errors. If one selected an error which was generated by comparing something to a baseline, one would see the baseline and test version of the observable.

Problem Reporting

Figure 12:
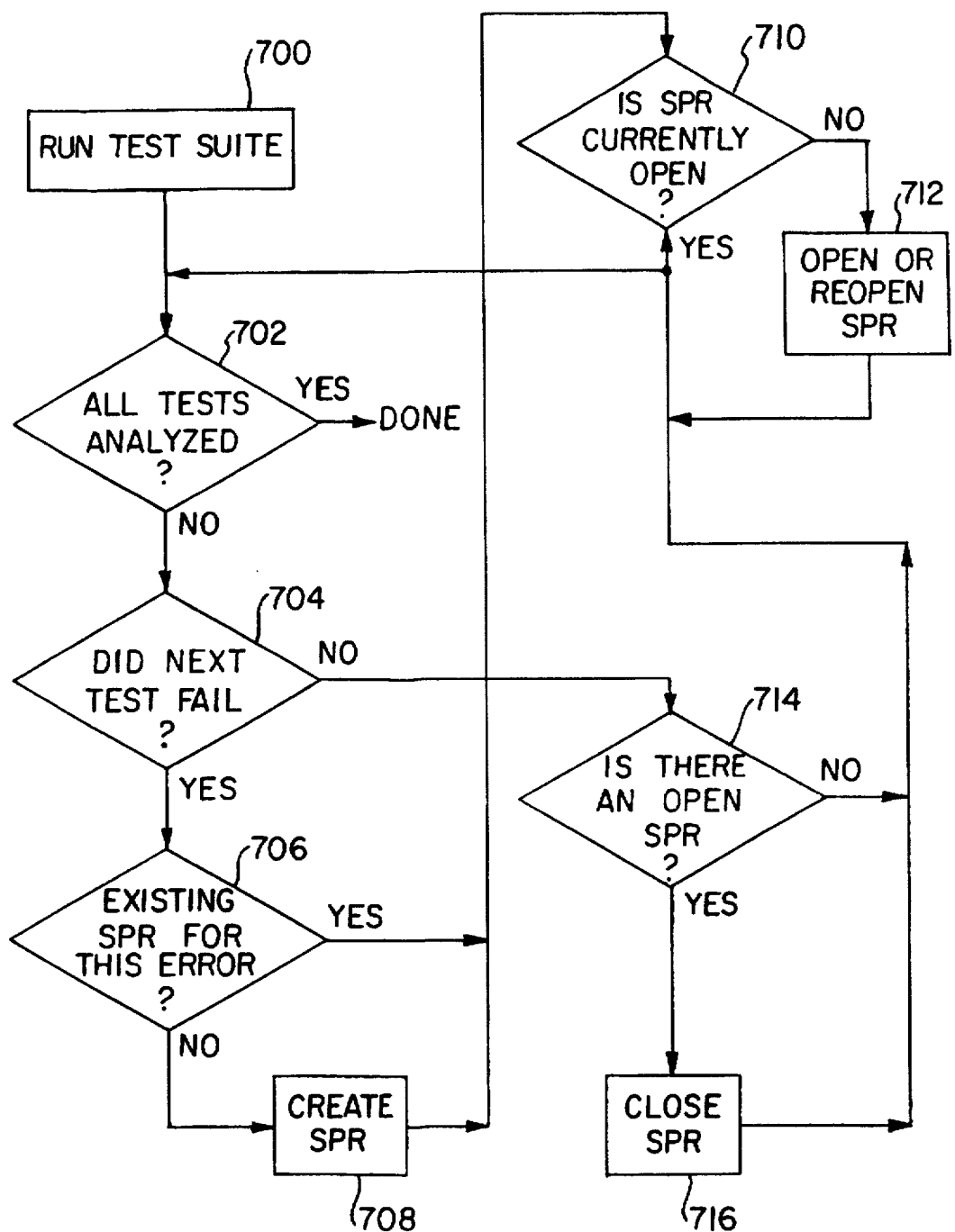
FIG. 12 is a flowchart for a software problem reporting system.

A good automated test tool can find application bugs at machine-gun speed, but at the cost of creating a problem with respect to processing the test tool's output. In order to avoid creating a bottleneck at that point in the process, another feature of the present invention is a Software Problem Reporting (SPR) system. In the preferred embodiment of this feature, the SPR system is built using Lotus Notes, a product of Lotus Development Corp. A flowchart for the SPR system can be seen in FIG. 12. In box 700 is depicted the execution of a suite of test scripts. In one embodiment of the present invention, the execution of the test suite will result in the creation of a results file as described above. In box 702 a query is made as to whether the problem reporting analysis is complete. If so, the process is exited. If not, the procedure searches for an error in the next test case in box 704. If an error did not occur, then an SPR database is searched for an open SPR (see box 714). The SPR database contains problem reports (indications of errors) which were generated during previous executions of test cases. If there was no open SPR, the procedure loops around and analyzes the next test case. If there was an open SPR after the successful execution of a test case, then the SPR is closed in box 716.

If a test does encounter an error (box 704), the SPR database is searched for an existing SPR for the error. If there was no SPR, one is created in box 708 and processing continues in box 710. If there was an existing SPR, a query is made as to whether the SPR is open or closed. If the SPR is already open, no action is taken and the process loops back to the beginning. If the SPR was previously closed, or newly created, the SPR is reopened or opened in box 712 and the process is repeated for the next test case. A distinct advantage of the automatic SPR system is that if the test case is detecting a bug which already has an open SPR, the report is suppressed, saving testing personnel from processing data about bugs that are already known. It is still necessary to subject the results of an automated run to human review, because it was possible for a given test case to uncover more than one bug. Therefore, the bug status recommendations, made automatically, should be verified before becoming final. The combination of the cross-platform automated test tool with the automated bug reporting capability described above contributes to a testing process that is an order of magnitude more efficient than a good manual effort.

The GUI superclass approach tends to encourage a least-common denominator approach to portability. But there still are many situations in which platform-specific issues arise. For example, only OpenLook™ has the "Push Pin" metaphor whereby popup menus can be kept displayed. One way of handling GUI-specific testing is to invoke platform-specific code at certain points in an otherwise portable test executive, the rest of the test executive being directed at the Application Superclass level. The test driver supports a call, GetGUIName, which a test executive can use to dynamically determine against which GUI it is running at any particular time. For example, assume that the File Open interface varies greatly from GUI to GUI. One method of resolving these differences is to write separate test routines to handle each of these dialogs in each GUI, and call the right one depending on which GUI is detected at runtime, as shown in this test executive:

| This GUI = GetGUIName(); | / gets the current GUI switch (ThisGUI) |
|---|---|
| { | |
| case Motif: | / executes the program |
| Motif_FileOpen(); | / Motif_FileOpen if the current GUI |
| break; | / is Motif |
| case Windows: | / executes Windows_FileOpen if the |
| Windows_FileOpen(); | / current GUI is Windows |
| break; | |
| case Mac: | / and so on |
| Mac_FileOpen(); | |
| break; | |
| case Open_Look: | |
| Open_Look_FileOpen(); | |
| break; } | |

Figure 13:
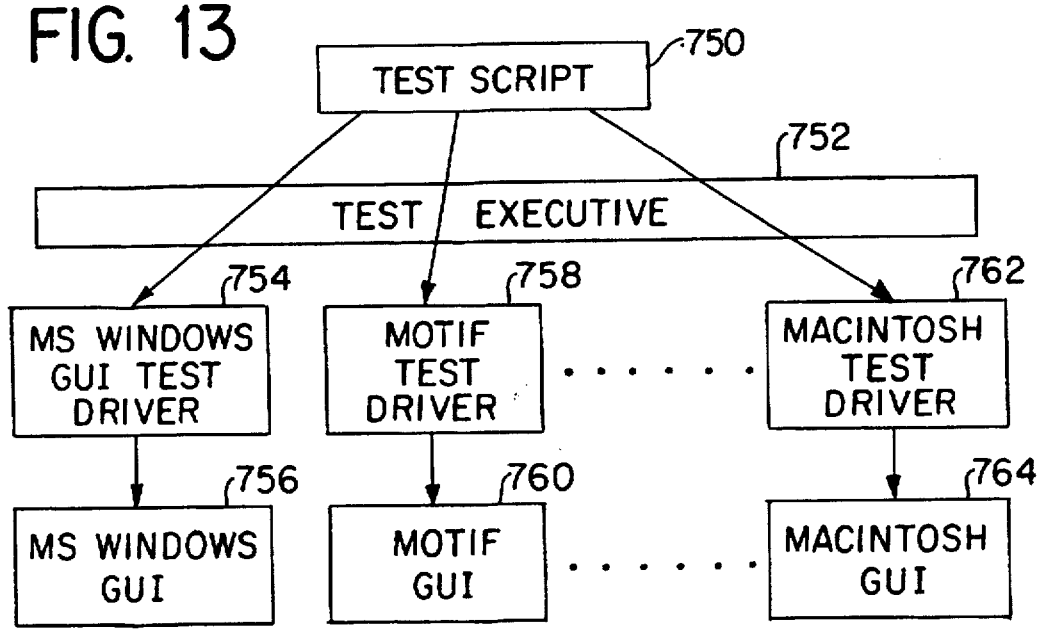
FIG. 13 depicts the portability of a test script developed using the present invention.

A more elegant solution would be to handle platform-specific issues at the test driver level. In this manner, the superclass level test scripts can then call the test driver functions in a standard way across GUIs, while the test driver code handles GUI-specific differences. This approach allows different FileOpen routines to be written at the driver level, but access to these routines is uniform (portable) in the test scripts. The driver-level solution is particularly appropriate when there are a small group of senior engineers supporting a large group of test script writers working in the test script language. An easy change to the driver-level code (e.g., if the GUI interface changes) can prevent a lot of churning at the test script level. Depicted in FIG. 13 is an illustration of the portability of a test script. A single test script, 750, can be run on any GUI (756, 760, 764) so long as it is written at the superclass level of GUI object instances. All GUI-specific references are handled either by the test executive, 752, (which is common to all GUIs) or the specific GUI test driver, 754, 758 or 762.

Should it be considered necessary to write some platform-specific code in the context of a regression suite that is otherwise cross-platform, standard software engineering techniques apply. For example, to limit the impact of platform-specific code on portability, engineers who need to write hardcode for performance reasons will often confine non-portable code to a discrete module, and essentially subclass the standard interface so that it calls the non-standard code while allowing the rest of the code to make calls to the standard interface. Porting the system to another hardware environment then just requires a single new module. If the pressure to port is great, the module can be removed altogether, allowing the rest of the code to use the standard interface and incur a performance penalty until the hardware-specific module is available for the new environment.

Figure 14:
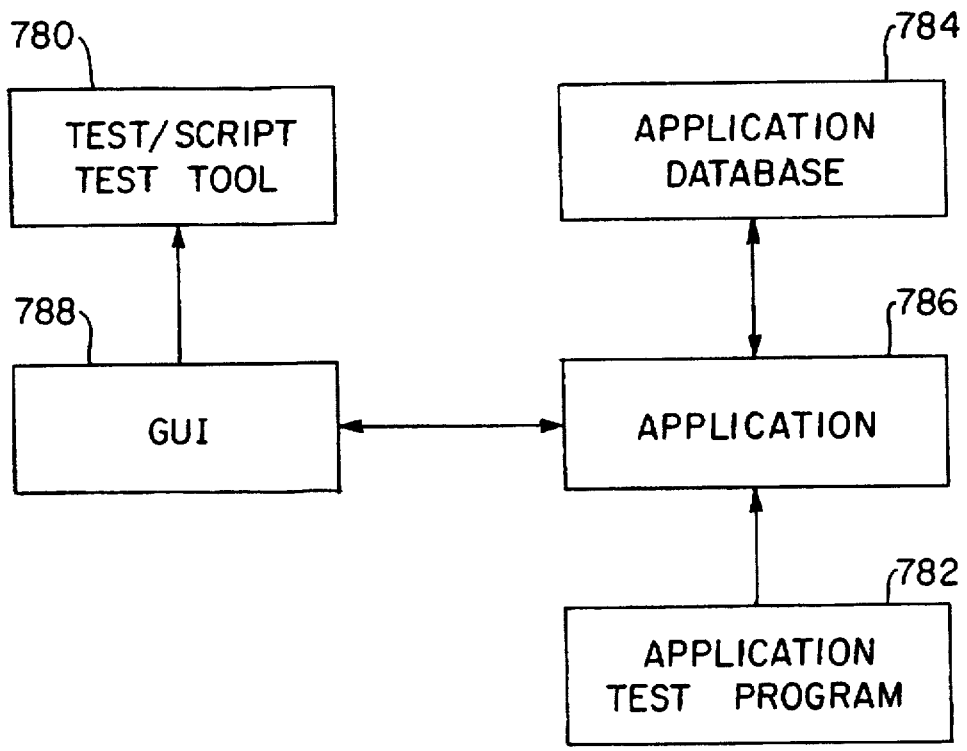
FIG. 14 illustrates combined GUI and application testing.

It is often desirable to combine API-level testing with GUI-level testing as is depicted in FIG. 14. For example, a good test strategy might be to modify the state of an application, 784, database through the application, 786, using an application test program, 782. The test script and test tool, 780, of the present invention can then be used to verify that the state of the GUI correctly reflects the database's new state. Conversely, one may want to modify the database, 784, through the user interface using the test script/test tool, 780, then verify at the application level 786 that the state of the database is what it should be given the GUI activity that has just taken place.

In one embodiment of the present invention, a test script can use multiple drivers simultaneously. By default, the test tool runs with 2 drivers, the test driver and the SYSTEM driver. Each driver is declared in the test script in a driver declaration, which consists of a list of all the functions provided by the specified driver. The way the test tool knows to which driver to send a function, is that no two drivers can have functions of the same name, i.e., every function name declared at any given time in the tool must be unique. The driver declaration includes, in addition to the function list, all the information needed by the test tool to locate the driver's executable file on the target machine or its unique identifier across the network. For example, you could use a database driver, a communications driver, and a GUI driver in the same test executive. The multiple-driver capability creates sufficient flexibility to permit the implementation of very sophisticated test cases.

Listed in Table 5 are partial GUI and SYSTEM driver declarations.

TABLE 5 driver GUI autoload cmdline "GUITD"
{
    APPID APP_Start (string sCmdLine);
    void PB_Click (WNDTAG wndTag);
    void WND_VerifyActive (WNDTAG wndTag);
}
driver System autoload cmdline "SYSTD"
{
    void SYS_CopyFile (string sSrcFile, string sDstFile);
    void SYS_MakeDir (string sDir);
}

Host-Target and Multiple-Target Testing

Figure 15:
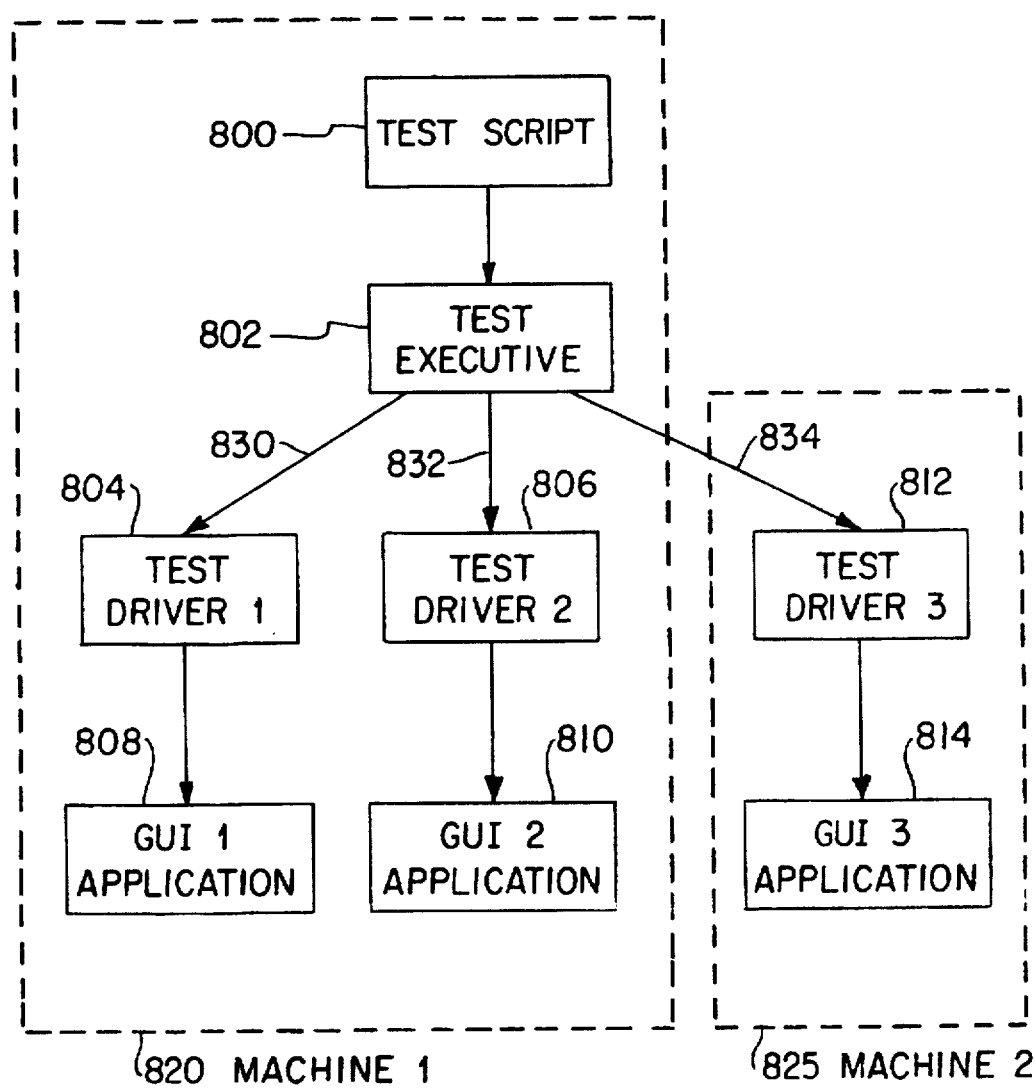
FIG. 15 illustrates the multi-target, machine capability of the present invention.

The test script of the present invention can run on the same or on a different machine than the test driver or drivers being used at any one time as depicted in FIG. 15. In FIG. 15, the test script, 800, and the test executive, 802, both reside on Machine 1, 820. Also resident on machine 1, 820, are test drivers 1 and 2 (804 and 806) and two different applications running under two different GUIs (808 and 810). The interfactes 830 and 832 follow the normal interprocess communication facility. Test driver 3, 812, and application and GUI 3, 814, both reside on a different processor, machine 2, 825. The interface 834 can be either through TCP/IP or any other interprocess communication medium, such as a network connection. The same test script, 800, is, thus, able to drive 3 different GUIs on 2 different machines. The example in FIG. 15 is merely for illustrative purposes and the present invention is not limited to 2 machines or 3 GUIs.

One limitation is that the test driver must be on the same machine as the software being tested. The architecture of the present invention allows host-target testing, which means that the test script can run without impacting the target environment, and which gives the test tool the capability of surviving lockups of the target machine. In addition, since test scripts are multi-threaded, a given test executive can drive multiple targets simultaneously in a coordinated way. For example, the test script, 800, in FIG. 15 can request 5 machines to access a database simultaneously, and then specify a rendezvous point in the test script that gains control only when all five have finished executing their parallel activities. Since the test tool has test drivers for all of the popular GUI's, a given test script can drive not only multiple targets simultaneously, but multiple heterogeneous targets. For example, a test script might want to interact with three Microsoft Windows™ and two Motif™ machines at the same time. Any platform which the test tool supports can run a version of the test executive that can be the host for driving any other supported platform. For example, a Microsoft Window target could be driven from a Motif™ host, or vice versa, using TCP/IP as the communications medium. The present invention can drive multiple targets simultaneously even under single-threaded operating systems like DOS, because the test executive relies on its own portable multi-threading package to handle multitasking.

Synchronization

A serious problem with CUI-paradigm test tools has been synchronizing the test with the target application (e.g., trying to fill a data entry field either before or after the field is available on the screen). Users of CUI-paradigm tools often try to cope with this problem by lacing their test scripts with hardcoded "sleep" statements. After filling out a query request, the test engineer will try to guess how long the query should take, sleep for that period of time, and then take a bitmap of the query results, which may (or may not) actually be on the screen after the specified interval. Painful trial-and-error efforts are necessary to get such an approach to work, and most of the intervals need to be changed when anything significant about the environment changes, such as running the tests on a faster (or slower) machine. Really defensive coding that uses this approach requires that the entire test suite be run as slowly as possible.

With the GUI-logical approach of the present invention, synchronization is by definition built into the process. Since the test tool allows test scripts to reference managed GUI objects by name, every test operation is tied to a specific named object. For example, a test script might request that a string be typed into a named entry field in a named dialog box, or that a click be issued against a named pushbutton in a named dialog box, or that a menu item be selected from a named menu. If the named LSE is available for the specified operation, the test driver executes the operation immediately. If the target object is not available, the driver waits for it to become available for a timeout interval that the user specifies either globally or at the test script level. Should the target not become available during the timeout interval, the test driver raises an exception.

Using the GUI-paradigm approach, a test script can fill out a dialog box requesting a query, OK the dialog box, and then immediately proceed to ask to examine the query results without worrying about how long the query will actually take. The test tool will wait until the query results have appeared on the screen, and only then will it actually examine the query results. In effect, each test command is triggered on the availability of the logical GUI object against which it acts, or on expiration of the timeout interval, whichever occurs first.

The present invention's triggered-on-object functionality drastically simplifies the problem of writing tests that run on different hardware and at different speeds. It also makes performance testing easy. The timeout interval becomes a performance threshold that the application cannot violate without triggering an error. For example, one could decide that no query under certain conditions should take longer than five seconds. The designer would set the timeout interval to five seconds at the beginning of a given sequence of tests via a test script command, and would then execute test scripts designed to probe this performance threshold. It could thus be determined exactly when, and under what conditions, the software fails to perform within the five-second boundary. All of this performance testing would be accomplished simply by setting the timeout interval, executing the queries, and asking to look at the query results. The appearance of the query results within the timeout interval satisfies the test. If the timeout interval expires before the results appears, the test fails. Since the test script does not represent a live recording of a user interaction session, the speed at which the test script drives the application is entirely under the script control. A suite of tests can be made to run slowly or much faster than the application can handle, or anywhere in between. The nature of object-oriented synchronization gives the tester a tremendous amount of control over all timing-related issues.

It might appear that the test commands of the present invention limit testing activity to "correct" operations against GUI objects. This is true in the sense that test executives leave GUI details to the test driver, which will implement them in some particular, correct way. However, the test tool does not require that test actions occur against named objects. The present invention allows the test programmer to drive the target directly through any arbitrary sequence of mouse movements and keystrokes. In this way, as many "wrong" actions as desired can be directed against the target. However, arbitrary mouse and keyboard events thrown against unknown objects are as liable to timing problems in the present invention as they are in any other test tool, since they are not triggered on the availability of a named object. Furthermore, programs using this functionality are not likely to be portable between GUIs.

APPENDIX A. TEST DRIVER FUNCTIONS

Application Manipulation Functions. The application manipulation functions lets one operate on applications:

| | |
|---|---|
| APP_Exit | Terminates an application, closing all open windows if possible; |
| APP_GetName | Returns the module name of an application; |
| APP_GetWindow | Returns the window tag for an application's main window; |
| APP_Start | Runs an application. |

Bitmap Functions. The bitmap functions let one capture and compare bitmaps:

| | |
|---|---|
| BMP_Capture | Saves a bitmap image of a window in a file; |
| BMP_Compare | Compares two bitmap files; |

- 64 -

| | | |
|---|---|---|
| | BMP_GetCrc | Gets Crc of a bitmap image; |
| | BMP_GetFileCrc | Gets Crc of a bitmap file; |
| | BMP_SetMatchInterval | Specifies the time interval for testing the stability of a bitmap image; |
| | BMP_SetMatchCount | Specifies the number of images that must be the same for an image to be stable; |
| | BMP_SetMatchTimeout | Specifies the timeout interval during which bitmaps must be identical; |
| | BMP_Verify | Verifies that a bitmap image matches a baseline bitmap file; |
| | BMP_Wait | Verifies that a bitmap image is unchanged during a timeout interval. |

Checkbox Functions. The checkbox functions operate on check boxes:

| | |
|---|---|
| CHK_GetState | Returns the selection state of a check box; |
| CHK_SetState | Sets the selection state of a check box; |
| CHK_Toggle | Toggles the selection state of a checkbox. |

Combo Box Functions. The combo box functions operate on combo boxes:

| | |
|---|---|
| CBO_Clear | Removes all text from a text field in a combo box; |
| CBO_GetContents | Returns all the choices from a list box in a combo box; |
| CBO_GetText | Returns the text from a text field in a combo box; |
| CBO_GetSelIndex | Returns the index of the selected |

|  |  |  |
|---|---|---|
|  |  | item in a list box within a combo box; |
|  | CBO_GetSelText | Returns the text of the selected item in a list box within a combo box; |
|  | CBO_HasText | Checks whether a combo box contains text items or graphical items; |
|  | CBO_Select | Selects an item in a list box in a combo box; |
|  | CBO_SetText | Replace the contents of a text field in a combo box. |

Driver Setup Functions. The driver setup functions configure the GUI driver and set up the QA Partner environment:

|  |  |
|---|---|
| GUI_GetCursor | Returns the name of the current cursor; |
| GUI_GetClipboard Text | Returns the contents of the clipboard as a list of strings; |
| GUI_GetName | Returns the name of the GUI the test driver is running under; |
| GUI_GetType | Returns the enumerated type of the GUI under which the test driver is running; |
| GUI_GetVersion | Returns the version number of the GUI the test driver is running under; |
| GUI_MessageBox | Displays an application module dialog box |
| GUI_SetKeyboardDelay | Specifies a delay to occur before every keystroke the test driver generates; |
| GUI_SetMouseDelay | Specifies a delay to occur before every mouse event the test driver generates; |

- 66 -

| | | |
|---|---|---|
| | GUI_SetWindowTimeout | Specifies the length of time the test driver should wait for a window to appear; |
| 5 | GUI_SetVerifyActive | Toggles automatic active window verification on and off; |
| | GUI_SetVerifyEnabled | Toggles automatic enabled window verification on and off; |
| | GUI_SetVerifyExposed | Toggles automatic exposed window verification on and off; |
| 10 | GUI_SetTrapFaults | Toggles automatic system fault trapping; |
| | GUI_SetShowFaults | Toggles automatic system fault showing; |
| 15 | GUI_WaitCursor | Returns how long it took a cursor to change. |

Keyboard Functions. The keyboard functions lets one pass keyboard events to the application you are testing:

| | | |
|---|---|---|
| | WND_PressKeys | Presses (but does not release) a set of keystrokes; |
| 20 | WND_ReleaseKeys | Releases a set of key presses; |
| | WND_TypeKeys | Generates a set of keystrokes as if a user were typing them. |

25 List Box Functions. The list box functions operate on list boxes:

| | | |
|---|---|---|
| | LB_DoubleSelect | Double-click on an item in a list box; |
| 30 | LB_ExtendSelect | Selects a series of items in an extended selection list box; |
| | LB_GetContents | Returns the contents of a list box; |
| 35 | LB_GetMultiSelIndex | Returns the index of each selected item in a multi-selection list box; |

| | | |
|---|---|---|
| | LB_GetMultiSelText | Returns the text of each selected item in a multi-selection list box; |
| 5 | LB_GetSelIndex | Returns the index of the selected item in a single-selection list box; |
| | LB_GetSelText | Returns the text of the sedated list box item in a single-selection list box; |
| 10 | LB_HasText | Checks whether a list box contains text items or graphical items; |
| | LB_IsMultiSel | Tests whether a list box supports multiple selections; |
| | LB_Select | Select an item in a list box; |
| 15 | LB_Unselect | Unselect an item in a multi-selection list box. |

Menu Functions. The menu functions lets one manipulate and check the status of menus in the application you are testing:

| | | |
|---|---|---|
| 20 | MENU_GetContents | Gets the contents of a menu bar; |
| | MENU_IsChecked | Tests whether a menu item is checked; |
| | MENU_Exists | Tests whether a menu or menu item exists; |
| 25 | MENU_IsEnabled | Tests whether a menu item is active (not grayed-out); |
| | MENU_Pick | Performs a menu selection in the active windows menu bar. |

| | | |
|---|---|---|
| 30 | Popup List Functions. | The popup list function allows one to manipulate popuplists: |
| | PL_GetContents | Returns the contents of a popup list; |
| 35 | PL_GetSelIndex | Returns the index of the selected item of a popup list; |

- 68 -

| | | |
|---|---|---|
| | PL_GetSelText | Returns the text of the selected item of a popup list; |
| | PL_HasText | Checks whether a popup list contains text or graphical items; |
| 5 | PL_Select | Selects an item in a popup list. |

Push button Functions. The push button functions lets one manipulate push buttons:

| | | |
|---|---|---|
| 10 | PB_Click | Generate a mouse click on a push button; |
| | PB_GetDefault | Returns the window tag for the default push button. |

Radio Button Functions. The radio button functions let you
15 operate on radio buttons:

| | | |
|---|---|---|
| | RB_GetChoice | Returns the index of the selected radio button; |
| | RB_GetState | Returns the selection state of a radio button; |
| 20 | RB_SetChoice | Generates a mouse click on a radio button. |

Scroll Bar Functions. The scroll bar functions lets one manipulate scroll bars:

| | | |
|---|---|---|
| 25 | SB_GetPosition | Returns the position of a scroll bar; |
| | SB_GetRange | Returns the minimum and maximum positions to which a scroll bar can be set; |
| 30 | SB_ScrollByLine | Scrolls a scroll bar line by line; |
| | SB_ScrollByPage | Scrolls a scroll bar page by page; |
| | SB_ScrollToMax | Scrolls a scroll bar to its maximum position; |
| 35 | SB_ScrollToMin | Scrolls a scroll bar to its minimum position; |

| | | |
|---|---|---|
| | SB_SetPosition | Sets the position of the scroll bar. |

System Functions. The system functions make calls to the operating system:

| | | |
|---|---|---|
| | SYS_CompareBinary | Compares two files; |
| | SYS_CompareText | Compares two text files; |
| | SYS_CopyFile | Copies a file; |
| | SYS_DirExists | Specifies whether a directory exists on the target system; |
| | SYS_Execute | Executes a program on the target system; |
| | SYS_FileExists | Specifies whether a file exists on the target system; |
| | SYS_GetDir | Gets the name of the current working directory on the target system; |
| | SYS_GetDirContents | Gets the contents of a directory on the target system; |
| | SYS_GetDrive | Gets the name of the current drive on the target system; |
| | SYS_GetEnv | Gets the value of an environment variable on the target system; |
| | SYS_GetFreeDiskSpace | Returns a report on the amount of disk space available the target system; |
| | SYS_GetFreeMemory | Returns a report on the amount of system memory available on the target system; |
| | SYS_GetFreeResources | Returns a report on the percentage of system resources that are free on the target system; |
| | SYS_GetName | Gets the name of the operating system on the target system; |
| | SYS_GetVersion | Gets the version of the operating |

|   |   |   |
|---|---|---|
| | | system on the target system; |
| | SYS_Kill | Kills a process running on the target system; |
| | SYS_MakeDir | Makes a directory on the target system; |
| | SYS_MoveFile | Rename a file on the target system; |
| | SYS_RemoveDir | Removes an empty directory on the target disk; |
| | SYS_RemoveFile | Deletes a file on the target system; |
| | SYS_SetDir | Changes the working directory on the target system; |
| | SYS_SetDrive | Sets the current drive on the target system; |
| | SYS_SetEnv | Sets the value of an environment variable on the target system. |

[Note: These System functions are not actually part of the GUI driver; they are in a separate executable.]

Text Field Functions. The text field functions lets one operate on text fields and static (read only) text fields:

|   |   |
|---|---|
| ST_GetText | Returns the text from a static (read only) text field; |
| ST_Clear | Removes all text from a text field; |
| ST_GetMultiText | Returns the lines of text from a multi-line text field; |
| ST_GetText | Returns the text from a text field; |
| ST_IsMultiText | Tests whether a text field is a multi-line text field; |
| ST_SetMultiText | Substitutes a list of text strings for all or part of the text in a multi-line text field; |
| ST_SetText | Substitutes a text string for all or part of the text in a text field. |

- 71 -

Window Functions. The window functions lets one operate on windows:

| | | |
|---|---|---|
| | WND_ClearTrap | Clears a window from the list of windows to trap; |
| 5 | WND_Click | Performs a mouse click in a window; |
| | WND_Close | Closes a window; |
| | WND_CompareTags | Determines whether two window tags both uniquely identify the same window; |
| 10 | WND_DoubleClick | Performs a mouse double-click in a window; |
| | WND_Exists | Tests whether a window exists; |
| | WND_GetActive | Returns the fully-qualified window tag for the active window; |
| 15 | WND_GetAppID | Gets the ID of the application that displays a window; |
| | WND_GetCaption | Returns the caption (title bar contents) of a window; |
| | WND_GetClass | Returns the class of a window; |
| 20 | WND_GetContents | Returns a list of the window tags for the children of a window; |
| | WND_GetFocus | Returns the window tag for the control with the input focus; |
| 25 | WND_GetFullTag | Returns the fully qualified window tag; |
| | WND_GetID | Returns the platform-specific window ID of a window; |
| | WND_GetIndex | Returns a windows index; |
| 30 | WND_GetParent | Gets the complete window tag for the parent of a window; |
| | WND_GetPriorStatic | Returns the static text string associated with a control; |
| | WND_GetRect | Gets information about the size and location of a window; |
| 35 | WND_IsEnabled | Tests whether a window is enabled; |

- 72 -

|   |                     |                                                                |
|---|---------------------|----------------------------------------------------------------|
|   | WND_Maximize        | Maximizes a window;                                            |
|   | WND-Minimize        | Minimizes (iconizes) a window;                                 |
|   | WND_Move            | Repositions a window;                                          |
|   | WND_MoveMouse       | Moves the mouse pointer to the specified location in a window; |
|   | WND_MultiClick      | Performs a specified number of mouse clicks in a window;       |
|   | WND_PressMouse      | Presses (but does not release) a mouse button;                 |
|   | WND_ReleaseMouse    | Releases a mouse button which was was previously pressed;      |
|   | WND_Restore         | Restores a window to its default size;                         |
|   | WND_SetActive       | Makes the specified window the active window;                  |
|   | WND_SetFocus        | Sets the focus to the specified control;                       |
|   | WND_SetTrap         | Adds a window to the list of windows to trap;                  |
|   | WND_Size            | Resizes a window;                                              |
|   | WND_VerifyActive    | Tests whether a window is active.                              |

APPENDIX B. BASIC WINDOW CLASSES
Summary of Basic Window Classes:

|                    |                                                          |
|--------------------|----------------------------------------------------------|
| AppleMenu          | Describes the Apple Macintosh" window;                   |
| AnyWin             | Describes any window in any GUI;                         |
| CheckBox           | Describes a check box;                                   |
| ChildWin           | Describes a child window;                                |
| ComboBox           | Describes a combo box;                                   |
| DialogBox          | Describes a dialog box;                                  |
| HelpMenu           | Describes a Macintosh" help menu;                        |
| HorizontalScrollBar| Describes a horizontal scroll bar that scrolls a window; |
| ListBox            | Describes a list box;                                    |
| MainWin            | Describes a main window;                                 |

- 73 -

| | |
|---|---|
| Menu | Describes a menu; |
| MenuItem | Describes a menu item; |
| PopupList | Describes a popup list; |
| PushButton | Describes a push button; |
| RadioButton | Describes a radio button; |
| ScrollBar | Describes a scroll bar; |
| StaticText | Describes a static text string; |
| SysMenu | Describes the system menu; |
| TextField | Describes a text field (one whose text can be specified by the user); |
| VerticalScrollBar | Describes a vertical scroll bar that scrolls a window. |

Alphabetical Listing of Window Classes:

Class: AnyWin

Default Window Tags: None

Properties:

| | |
|---|---|
| WndTag | Gets the window tag of the specified window. Calls the standard function WindowTag; |
| SuperClass | Gets the class of the specified window. Calls the standard function ClassOf; |
| sName | Gets the identifier name of the specified window. Calls the standard function WindowName; |
| wParent | Gets the parent window of the specified window. Calls the standard function WindowParent; |
| lwChildren | Gets the child windows of the specified window. Calls the standard function WindowChildren; |
| sClass | Gets the class specifier for the speci- |

- 74 -

|  | | fied window. Calls WND_GetClass; |
|---|---|---|
|  | Rect | Gets the size and position of the specified window. Calls WND_GetRect; |
|  | bEnabled | Gets the status of the specified window, TRUE if the window is enabled, and FALSE otherwise. Calls WND_IsEnabled; |
|  | bExists | Gets the status of the specified window, TRUE if the window exists, and FALSE otherwise. Calls WND_Exists; |
|  | sID | Gets the ID of the specified window. Calls WND_GetID; |
|  | iIndex | Gets the index of the specified window. Calls WND_GetIndex. |

Member Functions:

void Click (integer *iButton* (optional), integer *x* (optional), integer *y*). Generates a mouse click on the specified window. Calls WND_Click;

void DoubleClick (integer *iButton* (optional), integer *x* (optional), integer *y*). Generates a double click on the specified window. Calls WND_DoubleClick;

boolean Exists (number *nTimeout* (optional)). Checks whether the specified window exists. Calls WND_Exists;

string GetClass (). Gets the window class of the specified window. Calls WND_GetClass;

string GetID (). Gets the ID of the specified window. Calls WND_GetID;

integer GetIndex (string *sClass* (optional)). Gets the index of the specified window. Calls WND_GetIndex;

list of WNDTAG GetContents (). Gets the contents of the specified window as a list of window tags. Calls WND_GetContents;

WNDTAG GetParent (). Gets the parent window of the specified window. Calls WND_GetParent;

RECT GetRect (). Gets information about the size and location of the specified window. Calls WND_GetRect;

boolean IsEnabled (). Checks whether the specified window is enabled. Calls WND_IsEnabled;

void MoveMouse (integer *x* (optional), integer *y*). Moves the mouse pointer to the specified location. Calls WND_MoveMouse;

void PressKeys (string *sKeys*, number *nDelay* (optional)). Presses (but does not release) the specified keystrokes. Calls WND_PressKeys;

void PressMouse (integer *iButton* (optional), integer *x* (optional), integer *y*). Presses (but does not release) the specified mouse button. Calls WND_PressMouse;

Query (inout list of string *IsQuery*, integer *iIndent* (optional)). Returns information about the window as a list of strings;

void ReleaseKeys (string *sKeys*, number *nDelay* (optional)). Releases the specified key presses. Calls WND_ReleaseKeys;

void ReleaseMouse (integer *iButton* (optional), integer *x* (optional), integer *y*). Releases the specified mouse button. Calls WND_ReleaseMouse;

void TypeKeys (string *sKeys*, number *nDelay* (optional).
Generates the specified keystrokes as if a user were typing
them. Calls WND_TypeKeys.

---

Class: Apple Menu (derived from window class Menu)

Part of the Window Tag Specified in Window Declaration:
The label associated with the check box or (if it has no label), its index (#<*number*>) or GUI_specific internal ID.

Default Window Tags:
Macintosh"        $AppleMenu/

---

Class: CheckBox (derived from window class AnyWin)

Part of the Window Tag Specified in Window Declaration:
The label associated with the check box or (if it has no label), its index (#<*number*>) or GUI_specific internal ID.

Default Window Tags:
[CheckBox]

Properties:
bValue    Gets TRUE if the box is checked; FALSE otherwise.
          Calls CHK_GetState.
          Sets the state of the check box (TRUE = checked;
          FALSE = unchecked). Calls CHK_SetState.

Member Functions:
Boolean GetState (). Returns the selection state of the checkbox. Calls CHK_GetState.

Query (inout list of string *IsQuery*, integer *iIndent* (optional)). Returns information about the check box as a list of strings;

void SetFocus (). Gives the check box the input focus. Calls WND_SetFocus;

void SetState (boolean bState). Sets the selection state of the checkbox. Calls CHK_SetState.

void Toggle (). Toggles the selection state of the check box. Calls CHK_Toggle;

void VerifyValue (boolean *bExpectedValue*) Verifies whether the box is checked.

---

Class: ChildWin (derived from window class AnyWin)

Part of the Window Tag Specified in Window Declaration:
Window tags for main windows are GUI_specific. Test designer creates tag.

Default Window Tags: None for Macintosh" or Microsoft Windows"
Motif™                [ChildWin]

Properties:
sCaption     Gets the child window's caption. Calls WND_GetCaption.

Member Functions:
void Close (). Closes the child window. Calls WND_Close;

string GetCaption (). Gets the child window's caption.

- 78 -

Calls WND_GetCaption;

void Maximize (). Maximizes the child window. Calls WND_Maximize;

void Move (integer x, integer y). Moves the child window to the specified screen location. Calls WND_Move;

void Minimize (). Minimizes the child window. Calls WND_Minimize;

void Restore (). Returns the child window to its default size. Calls WND_Restore;

void SetActive (). Makes the child window the active window. Calls WND_SetActive;

void Size (integer x, integer y). Sets the size of the child window to the specified dimensions. Calls WND_Size;

---

Class: ComboBox (derived from class AnyWin)

Part of the Window Tag Specified in Window Declaration:
The caption associated with the combo box or, if it has no caption, its index (#<number>) or GUI_specific internal ID.

Default Window Tags:
Microsoft Windows"         [ComboBox]

Properties:
sValue         Gets the text from a text field in a combo box. Calls CBO_GetText.
               Sets the text in a text field in a combo

|  |  |  |
|---|---|---|
|  |  | box. Calls CBO_SetText; |
|  | iValue | Gets the index of the selected item in a list box within a combo box. Calls CBO_GetSelIndex. |
|  |  | Sets the selection in a list box in a combo box to the specified item. Calls CBO_Select; |
|  | isChoices | Gets the contents of a list box within a combo box. Calls CBO_GetContents; |
|  | bHasText | Gets TRUE if the combo box has text entries; FALSE if one or more are graphical. Calls CBO_HasText. |

Member Functions:

void Clear (). Removes all text from a text field in the combo box. Calls CBO_Clear;

list of string GetContents (). Gets the contents of a list box in the combo box. Calls CBO_GetContents;

integer GetSelIndex (). Gets the index of the selected item in a list box in the combo box. Calls CBO_GetSelIndex;

string GetSelText (). Gets the text of the selected item in a list box in the combo box. Calls CBO_GetSelText;

string GetText (). Gets the text from a text field in the combo box. Calls CBO_GetText;

boolean HasText (). Checks whether the combo box contains graphical items. Calls CBO_HasText;

Query (inout list of string *isQuery*, integer *iIndent* optional). Returns information about the combo box as a list of strings;

- 80 - void Select (LIST_ITEM *Item*). Selects an item in a list box in the combo box. Calls CBO_Select;

void SetFocus (). Gives the combo box the input focus. Calls WND_SetFocus;

void SetText (string *sText*). Sets the text of a text field in a combo box to the specified string. Calls CBO_SetText;

VerifyChoices (list of string *sExpectedChoices*). Verifies that the contents of the combo box contains the expected strings;

VerifyValue (LIST_ITEM *aExpectedValue*). Verifies that the combo box selection is the expected one.

----------------------------------------------------------------

Class: DialogBox (derived from window class AnyWin)

Part of the Window Tag Specified in Window Declaration:
The dialog box's caption or (if it has no caption), its index (*#<number>*) or GUI_specific internal ID *($<ID>)*.

Default Window Tags:
| | |
|---|---|
| Microsoft Windows" | [DialogBox] |
| Motif" | [DialogBox] |
| Macintosh" | [2:*] |

Properties:
sCaption    Gets the caption of the dialog box. Calls WND_GetCaption.

Member Functions:
list of string Capture (string *sFileName*). Returns informa-

- 81 - tion about the dialog box as a list of strings in the file *sFileName*. Use in combination with Verify;

void Close (). Closes the dialog box. Calls WND_Close;

string GetCaption (). Gets the caption of the dialog box. Calls WND_GetCaption;

void Move (integer *x*, integer *y*). Moves the dialog box to the specified screen location. Calls WND_Move;

void Query (inout list of string *isQuery*, integer *iIndent* optional). Returns information about the dialog box as a list of strings;

void SetActive (). Makes the dialog box the active window. Calls WND_SetActive;

void Verify (string *sFileName*). Verifies the contents of a dialog box using the contents of *sFileName*. Use in combination with Capture;

void VerifyActive (). Verifies that the dialog box is the active window. Calls WND_VerifyActive.

------------------------------------------------------------

Class: PopupList (derived from class AnyWin)

Part of the Window Tag Specified in Window Declaration:
The caption associated with the popup list or, if it has no caption, its index (#<*number*>) or GUI_specific internal ID.

Default Window Tags:
Microsoft Windows"     [PopupList]

- 82 -

```
    Macintosh"              [PopupList]
    Motif"                  [PushButton]

Properties:
5       sValue          Gets the selected text from a PopupList.
                        Calls PL_GetSelText.
                        Sets the selection in a popup list.  Calls
                        PL_Select;
        iValue          Gets the index of the selected item in the
10                      popup list.  Calls PL_GetSelIndex.
                        Sets the selection in popup list to the
                        specified item.  Calls PL_Select;
        isChoices       Gets the contents of a popup list.  Calls
                        PL_GetContents;
15      bHasText        Gets TRUE if the popup list has text en-
                        tries; FALSE if one or more are graphical.
                        Calls PL_HasText.
```

Member Functions:
```
20      list of string GetContents ().  Gets the contents of the
        popup list.  Calls PL_GetContents;

integer GetSelIndex ().  Gets the index of the selected item
        in a popup list.  Calls PL_GetSelIndex;
25
        string GetSelText ().  Gets the text of the selected item in
        a popup list.  Calls PL_GetSelText;

boolean HasText (LIST-ITEM item (optional)). Checks whether
30      the popup list contains graphical items.  Calls PL_HasText;

Query (inout list of string isQuery, integer iIndent
        optional).  Returns information about the popup list as a
        list of strings;
35
```

- 83 - void Select (LIST_ITEM *Item*). Selects an item in a popup list. Calls PL_Select;

VerifyChoices (list of string *sExpectedChoices*). Verifies that the contents of the popup list contains the expected strings;

VerifyValue (LIST_ITEM *aExpectedValue*). Verifies that the popup list selection is the expected one.

---

Class: HorizontalScrollBar (derived from window class ScrollBar)

Part of the Window Tag Specified in Window Declaration:
Horizontal scroll bars that are part of a window are almost always a child of that window. Declare the scroll bar as a child of its parent window, or include its fully qualified window tag.

Default Window Tags:
| | |
|---|---|
| Microsoft Windows™ | $HorizontalScrollBar |
| Macintosh™ | $HorizontalScrollBar |
| Motif™ | [ScrollBar] |

---

Class: ListBox derived from window class AnyWin)

Part of the Window Tag Specified in Window Declaration:
The label associated with the list box or (if it has no label, its index *(#<number>)* or GUI-specific internal ID

Default Window Tags:
[ListBox]

- 84 -

Properties:

| | | |
|---|---|---|
| | iValue | Gets the index value of the selected item in a single-selection list box. Calls LB_GetSelIndex. |
| | | Selects the item in a single-selection list box with the specified index value. Calls LB_Select; |
| | sValue | Gets the text of the selected item in a single-selection list box. Calls LB_GetSelText. |
| | | Selects the item in a single-selection list box with the specified text. Calls LB_GetSelText; |
| | liValue | Gets the index values of all the selected entries in a multi-selection list box. Calls LB_GetMultiSelIndex; |
| | lsValue | Gets the text of all the selected entries in a multi-selection list box. Calls LB_GetMultiSelText; |
| | lsChoices | Gets the contents of the list box as a list of strings. Calls LB_GetContents; |
| | bHastext | Gets TRUE if the list box has text items; FALSE if one or more items are graphical; |
| | bIsMulti | Gets TRUE if the list box is a multi-selection list box; FALSE otherwise. Calls LB_IsMultiSel. |

Member Functions:

void DoubleSelect (LIST_ITEM *Item*). Double-click on an item in the list box. Calls LB_DoubleSelect;

void ExtendSelect (LIST _ ITEM *Item*). Selects a series of items in the extended selection list box. Calls LB_ExtendSelect;

list of string GetContents (). Gets the contents of the
list box.  Calls LB_GetContents;

list of integer GetMultiSelIndex (). Gets the index of each
selected item in the multi-selection list box.  Calls
LB_GetMultiSelIndex;

list of string GetMultiSelText (). Gets the text of each
selected item in the multi-selection list box.  Calls
LB_GetMultiSelText;

integer GetSelIndex (). Gets the index of the selected item
in the list box.  Calls LB_GetSelIndex;

string GetSelText (). Gets the text of the selected item in
the list box.  Calls LB_GetSelText;

boolean HasText (). Checks whether the list box contains
text or graphics.  Calls LB_HasText;

boolean IsMultiSel (). Checks whether the list box is a
multi-selection list box.  Calls LB_IsMultiSel;

Query (inout list of string isQuery, integer iIndent
optional. Returns information about the list box as a list
of strings;

void SelectItem (LIST_ITEM Item). Selects the specified
item in the list box.  Calls LB_Select.

void SetFocus (). Gives the list box the input focus.  Calls
WND_SetFocus;

void UnSelect (LIST_ITEM Item). Unselects the specified
item in the multi-selection list box.  Calls LB_UnSelect;

- 86 -

VerifyValue (anytype *aExpectedValue*). Verifies that the list box has the expected selection;

VerifyChoices (list of string *isExpectedChoices*). Verifies that the list box has expected choices.

- - - - - - - - - - - - - - - - - - - - - - - - - - - - - - - - - - - - - - - - - - - - - - - - - - - - - - - - - -

Class: MainWin (derived from window class AnyWin)

Part of the Window Tag Specified in Window Declaration:
Window tags for main windows are GUI_specific. Test designer creates tag.

Default Window Tags: None for Macintosh" or Microsoft Windows"
Motif™          [MainWin]

Properties:
| | |
|---|---|
| AppId | Gets the ID of the application that displays the main window. Calls WND_GetAppID; |
| sCaption | Gets the main window's caption. Calls WND_GetCaption. |

Member Functions:
list of string Capture (string *sFileName*). Returns information about the main window as a list of strings in the file *sFileName*. Use in combination with Verify;

void Close (). Closes the main window. Calls WND_Close;

WNDTAG_GetActive (). Returns the window tag of the active child of the main window. Calls WND_GetActive;

APPID GetAppID (). Gets the ID of the application that displays the main window. Calls WND_GetAppID;

string GetCaption (). Gets the main window's caption. Calls WND_GetCaption;

void Maximize (). Maximizes the main window. Calls WND_Maximize;

void Move (integer x, integer y). Moves the main window to the specified screen location. Calls WND_Move;

void Minimize (). Minimizes the main window. Calls WND_Minimize;

Query (inout list of string isQuery, integer iIndent optional). Returns information about the main window as a list of strings;

void Restore (). Returns the main window to its default size. Calls WND_Restore;

void SetActive (). Makes the main window the active window. Calls WND_SetActive;

void Size (integer x, integer y). Sets the size of the main Window to the specified dimensions. Calls WND_Size;

void Verify (string sFileName). Verifies the contents of a main window using the contents of sFileName. Use in combination with Capture;

void VerifyActive (). Verifies that the main window is active. Calls WND_VerifyActive.

Class: Menu (derived from window class AnyWin)

Part of the Window Tag Specified in Window Declaration:
The name of the menu as it appears in the application Default Window Tags:
$Menu/

Properties:
- isContents    Gets the contents of the menu. Calls MENU_GetContents;
- bEnabled      Gets TRUE if the menu is active; FALSE otherwise. Calls MENU_IsEnabled.
- bExists       Returns TRUE if the menu exists; FALSE otherwise. Calls MENU_Exists.

Member Functions:
list of string GetContents (). Gets the contents of the menu. Calls MENU_GetContents;

boolean IsEnabled (). Verifies that the menu is enabled. Calls MENU_IsEnabled;

boolean Exists (). Verifies that the menu exists. Calls MENU_Exists;

void Pick (). Selects one of the items on the menu's menu bar. Calls MENU_Pick;

Query (inout list of string *isQuery*, integer *iIndent* optional). Returns information about the menu as a list of strings;

void VerifyContents (list of string *IsExpectedContents*). Verifies that the menu has the expected contents;

Class: MenuItem (derived from window class AnyWin)

Part of the Window Tag Specified in Window Declaration:
   The menu item as it appears in the application

Properties:
   IsContents   Gets the contents of the menu item. Calls MENU_GetContents;
   bEnabled     Gets TRUE if the menu item is active; FALSE otherwise. Calls MENU_IsEnabled;
   bExists      Returns TRUE if the menu item exists; FALSE otherwise. Calls MENU_Exists;
   bChecked     Gets TRUE if the menu item is checked; FALSE otherwise. Calls MENU_IsChecked.

Member Functions:
   boolean Exists (). Verifies that the menu item exists. Calls MENU_Exists;

list of string GetContents (). Gets the contents of the menu item. Calls MENU_GetContents;

boolean IsChecked (). Verifies that the menu item is checked. Calls MENU_IsChecked;

boolean IsEnabled (). Verifies that the menu item is enabled. Calls MENU_IsEnabled;

void Pick (). Selects the menu item from the menu bar. Calls MENU_Pick;

Query (inout list of string *isQuery*, integer *iIndent* optional). Returns information about the menu item as a list of strings;

```
        void VerifyContents (list of string IsExpectedContents).
        Verifies that the menu item has the expected contents.

------------------------------------------------------------

5
    Class:  PushButton (derived from window class AnyWin)

Part of the Window Tag Specified in Window Declaration:
            The label associated with the push button or (if its label
10          is graphical), its index (#<number>) or GUI-specific
            internal ID Default Window Tags:
                            [PushButton]
15
    Member Functions:
            void Click ().  Generates a mouse click on the push button.
            Calls PB_Click;

20          void SetFocus ().  Gives the push button the input focus.
            Calls WND_SetFocus.

------------------------------------------------------------

25  Class:  RadioButton (derived from window class AnyWin)

Part of the Window Tag Specified in Window Declaration:
            The label associated with the radio button or (if its label
            is graphical), its index (#<number>) or GUI_specific
30          internal ID Default Window Tags:
                            [RadioButton]

35
```

Properties:

iValue        Gets the index of the radio button. Calls RB_GetChoice.
                      Generates a mouse click on the specified radio button. Calls RB_SetChoice.

bValue        Gets the state of the radio button. Calls RB_GetState.
                      Selects the specified radio button. Calls RB_SetChoice.

Member Functions:

integer GetChoice (). Gets the index of the radio button. Calls RB_GetChoice;

boolean GetState (integer *iChoice* optional). Gets the selection state of the radio button. Calls RB_GetState;

Query (inout list of string *isQuery*, integer *iIndent* optional). Returns information about the radio button as a list of strings;

void SetChoice (integer *iChoice* optional). Sets the selection state of the radio button. Calls RB_SetChoice;

void SetFocus (). Gives the radio button the input focus. Calls WND_SetFocus.

VerifyValue (any type *aExpectedValue*). Verifies that the radio button has the expected value.

- 92 -

Class: ScrollBar (derived from window class AnyWin)

Part of the Window Tag Specified in Window Declaration:
Scroll bars that set a value in the application are almost always a child of the window they appear in. Declare the scroll bar as a child of its parent window, use its index *(#<number>)* or GUI_specific internal ID, or include its fully qualifiedwindow tag.

Default Window Tags:
[ScrollBar]

Properties:

| | |
|---|---|
| iValue | Gets the position of the scroll bar. Calls SB_GetPosition. |
| | Sets the position of the scroll bar. Calls SB_SetPosition; |
| Range | Gets the range of the scroll bar. Calls SB_GetRange. |

Member Functions:

integer GetPosition (). Gets the position of the scroll bar. Calls SB_GetPosition;

CTLRANGE GetRange (). Gets the minimum and maximum positions to which the scroll bar can be set. Calls SB_GetRange;

Query (inout list of string *isQuery*, integer *iIndent* optional). Returns information about the scroll bar as a list of strings;

void ScrollByLine (integer *iAmount*). Scrolls the scroll bar by the specified number of lines. Calls SB_ScrollByLine;

void ScrollByPage (integer *iAmount*). Scrolls the scroll bar by the specified number of pages. Calls SB_ScrollByPage;

void ScrollToMax (). Scrolls the scroll bar to its maximum position. Calls SB_ScrollToMax;

void ScrollToMin (). Scrolls the scroll bar to its minimum position. Calls SB_ScrollToMin;

void SetPosition (integer *iPosition*). Sets the position of the scroll bar. Calls SB_SetPosition;

VerifyValue (integer *iExpectedValue*). Verifies that the scroll bar has the expected value.

-----------------------------------------------------------------

Class: StaticText (derived from window class AnyWin)

Part of the Window Tag Specified in Window Declaration:
The index *(#<number>)* or GUI_specific internal ID of the text string

Default Window Tags:
[StaticText]

Properties:
sValue        Gets the text from the static text field. Calls ST_GetText.

Member Functions:
string GetText (integer *iStartChar* optional, integer *iNumChars* optional). Gets the text in the static text field. Calls ST_GetText;

- 94 -

Query (inout list of string *IsQuery*, integer *iIndent* optional). Returns information about the static text field as a list of strings;

5    VerifyValue (string *sExpectedValue*). Verifies that the static text string matches the expected string.

---------------------------------------------------------------

10   Class: SysMenu (derived from window class AnyWin)

Part of the Window Tag Specified in Window Declaration:
The name of the system menu as it appears in the application 15   Default Window Tags:
$SysMenu/

---------------------------------------------------------------

20   Class: TextField (derived from window class AnyWin)

Part of the Window Tag Specified in Window Declaration:
The label associated with the text field or (if it has no label), its index (#<*number*>) or GUI_specific internal ID
25
Default Window Tags:
[TextField]

Properties:
30   sValue          Gets the text from the text field. Calls TF_GetText.
                    Sets the text string in the text field to the specified string. Calls TF_SetText;
     isValue        Gets the text from a multi-line text field.
35                  Calls TF_GetMultiText.

- 95 -

|  | Sets the text strings in a multi_line text field to the specified list of strings. Calls TF_SetMultiText; |
|---|---|
| bIsMulti | Gets TRUE if the text field is a multi-selection text field; FALSE otherwise. Calls TF_IsMultiText. |

Member Functions:

void Clear (). Clears the text field;

list of string GetMultiText (integer *iStartLine* optional, integer *iNumLines* optional). Gets the lines of text in the multi-fine text field. Calls TF_GetMultiText;

string GetText (integer *iStartChar* optional, integer *iNumChars* optional). Gets the text in the text field. Calls TF_GetText;

boolean IsMultiText (). Checks whether a text field is a multi-line text field. Calls TF_IsMultiText;

Query (inout list of string *isQuery*, integer *iIndent* optional). Returns information about the text field as a list of strings;

void SetMultiText (list of string *sText*, integer *iStartLine* optional, integer *iNumLines* optional). Sets the lines of text in the multi-line text field to the specified strings. Calls TF_SetMultiText;

void SetFocus (). Gives the text field the input focus. Calls WND_SetFocus;

void SetText (string *sText*, integer *iStartChar* optional, integer *iNumChars* optional). Sets the text in the text field to the specified string. Calls TF_SetText;

VerifyValue (anytype aExpectedValue). Verifies that the text in the text field matches the expected text.

---

Class: VerticalScrollBar (derived from window class ScrollBar)

Part of the Window Tag Specified in Window Declaration:
Vertical scroll bars that are part of a window are almost always a child of that window. Declare the scroll bar as a child of its parent window, or include its fully qualified window tag.

Default Window Tags:
| | |
|---|---|
| Microsoft Windows™ | $VerticalScrollBar |
| Macintosh™ | $VerticalScrollBar |
| Motif™ | [vScrollBar] |

APPENDIX C. WINDOW PARTS

| | |
|---|---|
| $ClientArea | The main part of the window. |
| $Caption | The title bar at the top of the window. |
| $SysMenu | The 'control menu,' located in the upper-left corner of the window. |
| $GrowBox | The (unused) area to the right of the horizontal scroll bar and below the vertical scroll bar in windows that have two scroll bars. |
| $Menu | The rectangular area just below the caption that contains the menu names. |
| $HorizontalScrollBar | The horizontal scroll bar. |
| $VerticalScrollBar | The vertical scroll bar. |
| $MinimizeBox | The Minimize box (used to iconize/restore the window). |

| | | |
|---|---|---|
| | $MaximizeBox | The Maximize box (used to maximize the window). |
| | $LeftEdge | The border on the left side of the window, which is used to change the |
| 5 | | size of the window horizontally. |
| | $RightEdge | The border on the right side of the window. |
| | $TopEdge | The border on the top of the window. |
| | $BottomEdge | The border on the bottom of the window. |
| 10 | $TopLeftCorner | The part of the border above and to the left of the control menu. |
| | $TopRightCorner | The part of the border above and to the right of the Maximize box. |
| | $BottomLeftCorner | The part of the border below and to the |
| 15 | | left of the horizontal scroll bar. |
| | $BottomRightCorner | The part of the border below and to the right of the horizontal scroll bar. |

Having thus described the present invention, it is to be understood that the above-described methods and apparatus are illustrative of the principles of the present invention and that other methods and apparatuses may be devised by those skilled in the art, without departing from the spirit and scope of the invention.

We claim:

1. A method of testing an application program's use of a first Graphical User Interface (GUI), said application program and a test script executing concurrently, said test script containing a sequence of test instructions, said method comprising:

simulating a user action directly to said first GUI in response to said test instructions;

monitoring said GUI for actual alterations in one or more logical screen elements, said logical screen elements originating from said execution of said application program;

comparing said actual alterations to expected alterations; and reporting an error if said actual alterations are not equal to said expected alteration.

2. A method according to claim 1 further comprising naming said logical screen elements in said test script according to a non-GUI specific protocol.

3. A method according to claim 2 wherein a test program executes said test script, said test program performing said translating step.

4. A method according to claim 3 wherein said simulating step further comprises:

said test program executing one or more of said test instructions from said test script, said one or more test instructions representing said user action;

generating one or more GUI specific in response in response to said execution of said one or more test instructions; and transmitting said one or more GUI specific instructions to said GUI.

5. A method according to claim 3 wherein said simulating step further comprises:

waiting a predetermined amount of time for said actual changes; and raising an exception if said actual changes do not occur within said predetermined amount of time.

6. A method according to claim 3 wherein said monitoring step further comprises:

said test program executing a status request from said test script;

generating one or more GUI specific instructions in response to said execution of said status request;

transmitting said one or more GUI specific instructions to said GUI; and receiving and returning said requested status to said test program.

7. A method of testing an application program's use of a first Graphical User Interface (GUI) in a computer system comprising the steps of:

executing the application program;

executing a test script concurrently with the execution of the application program, said test script containing a sequence of non-GUI specific test instructions, the test script execution step comprising the step of simulating a user action directly to said first GUI in response to said test instructions, wherein the test script execution step further comprises translating said test instructions into GUI specific instructions;

monitoring said GUI for actual alterations in at least one display independent logical screen element originating from said execution of said application program, said display independent logical screen element being an object created by said application program within said GUI;

comparing said actual alterations to expected alterations; and reporting an error if said actual alterations are not equal to said expected alteration.

8. A method of testing an application program's use of a first Graphical User Interface (GUI) in a computer system comprising the steps of:

executing the application program;

executing a test script concurrently with the execution of the application program, said test script containing a sequence of non-GUI specific test instructions, the test script execution step comprising the step of simulating a user action directly to said first GUI in response to said test instructions;

monitoring said GUI for actual alterations in at least one display independent logical screen element originating from said execution of said application program, said display independent logical screen element being an object created by said application program within said GUI;

comparing said actual alterations to expected alterations;

reporting an error if said actual alterations are not equal to said expected alteration; and performing said simulating, monitoring, comparing and reporting steps with respect to a second GUI.

9. A method according to claim 8 wherein said performance with respect to said second GUI is concurrent with testing against said first GUI.

10. A method according to claim 9 wherein said second GUI is different from said first GUI.

11. A method according to claim 9 wherein said second GUI resides on a different computer system from said first GUI.

12. A method of testing an application program's use of a first Graphical User Interface (GUI) in a computer system comprising the steps of:

executing the application program;

executing a test script containing a sequence of non-GUI specific test instructions concurrently with the execution of the application program, comprising the steps of reading one of said test instructions from said test script, searching for a display independent logical screen element, said display independent logical screen element being an object created by said application within said GUI, said one of said test instructions requesting an action against said display independent logical screen element; and upon finding said display independent logical screen element, performing said requested action;

monitoring said display independent logical screen element for actual alterations;

comparing said actual alterations to expected alterations; and raising an exception if said actual alterations are not equal to said expected alteration.

13. A method according to claim 12 further comprising performing non-GUI related actions if said one of said test instructions does not involve said GUI.

14. A method according to claim 12 further comprising translating said test instruction from said test script.

15. A method according to claim 12 further comprising:

waiting a predetermined amount of time during said search for said logical screen element; and raising an exception if said first predetermined amount of time expires prior to finding said logical screen element.

16. A method according to claim 12 further comprising:

testing said logical screen element after it is found, said test determining if said logical screen element is in a desired state for said requested action.

17. A method according to claim 16 further comprising:

repeating said test of said logical screen element for a predetermined amount; and raising an exception if said predetermined amount of time expires prior to said logical screen element attaining said desired state.

18. A method according to claim 12 wherein said requested action simulates a user input, said method further comprising:

waiting a predetermined amount of time during said monitoring of said logical screen element; and raising an exception if said predetermined amount of time expires and no alterations occur in said logical screen element.

19. A system for testing an application program's use of a Graphical User Interface (GUI), said testing system comprising:

a least one computer system, said GUI and said application residing on said computer system;

a test script containing a sequence of non-GUI specific test instructions;

a test program, said test program having means for translating said non-GUI specific test instructions into GUI specific test instructions; and a test driver, said test driver having means for generating screen dependent instructions from said GUI specific test instructions.

20. A system according to claim 19 further comprising:

an interface between said application and said GUI; and a first monitoring means in said test driver for monitoring said interface between said application and said GUI.

21. A system according to claim 20 further comprising a second monitoring means in said test driver for monitoring changes in said GUI.

22. A system according to claim 19 further comprising:

a physical screen element manager, PSEM in said GUI, said PSEM having an interface for user devices; and an interface between said test driver and said PSEM.

23. A system according to claim 22 further comprising said generation means in said test driver using said interface between said test driver and said PSEM.

24. A method of testing an application program's use of a first Graphical User Interface (GUI), said first GUI containing logical screen elements (LSE) generated by said application, said method comprising:

requesting an action against a named LSE, said LSE being named in a non-GUI specific manner;

resolving said non-GUI specific name of said LSE into a GUI specific reference;

generating one or more GUI specific commands which accomplish said requested action; and communicating said one or more GUI specific commands to said GUI.

25. A method according to claim 24 wherein said resolving step comprises constructing a window tag for said named LSE, said window tag uniquely identifying said LSE in GUI specific terms.

26. A method according to claim 25 wherein said constructing step comprises:

identifying a class of said named LSE, said class being one of a set of classes defining characteristics of all LSEs in said GUI;

extracting a default window tag from said class definition;

determining a tag part from a previous declaration of said named LSE; and combining said default window tag and said tag part into said window tag.

27. A method according to claim 26 wherein said named LSE contains several levels of names, said resolution step further comprises repeating said identifying, extracting, determining and combining step for each of said levels in said name.

28. A method according to claim 24 wherein said generating step comprises:

calling an internal function which corresponds to said requested action, said GUI specific reference to said LSE being passed to said internal function as a parameter; and developing said one or more GUI specific commands using said GUI specific reference to said LSE.

29. A method according to claim 24 further comprising:

testing said GUI for expected alterations in said named LSE;

reporting an error if said expected alteration do not occur.

30. A method according to claim 29 wherein said testing step comprises:

monitoring said GUI for actual alterations in said LSE; and comparing said actual alterations to said expected alterations.

31. A method according to claim 30 further comprising retrieving said expected alterations from a test database.

32. A method according to claim 30 further comprising storing said reported error in an error database.

* * * * *